United States Patent [19]

Krueger

[11] Patent Number: 4,946,329
[45] Date of Patent: Aug. 7, 1990

[54] MICROMANIPULATOR USING HYDRAULIC BELLOWS

[75] Inventor: John W. Krueger, New Rochelle, N.Y.

[73] Assignee: Albert Einstein College of Medicine of Yeshiva University, Bronx, N.Y.

[21] Appl. No.: 176,599

[22] Filed: Apr. 1, 1988

[51] Int. Cl.$^5$ .............................................. B25J 3/00
[52] U.S. Cl. .......................................... 414/4; 901/8; 414/2; 60/533; 60/592; 60/329; 350/321; 74/479
[58] Field of Search ................... 414/4, 5, 1.2; 901/8, 901/22; 60/533, 592, 329, 572; 92/1, 35, 39; 350/529–533, 321; 74/479

[56] References Cited

U.S. PATENT DOCUMENTS

| | | |
|---|---|---|
| 1,859,823 | 5/1932 | Fitz . |
| 1,987,733 | 1/1935 | De Fonbrune .......................... 414/2 |
| 2,072,693 | 3/1937 | Volkert ................................. 60/592 |
| 2,293,604 | 9/1937 | Gallasch ............................... 350/521 |
| 2,536,628 | 1/1951 | Denisoff ........................... 60/329 X |
| 2,545,258 | 3/1951 | Cailloux ...................... 74/471 XY X |
| 2,800,055 | 7/1957 | May ................................ 350/321 X |
| 3,508,806 | 4/1970 | Hall ....................................... 350/90 |
| 3,525,140 | 8/1970 | Cachon et al. ......................... 29/200 |
| 3,720,849 | 3/1973 | Bardocz ................................... 310/8 |
| 3,768,331 | 10/1973 | Christy .................................. 74/491 |
| 3,779,400 | 12/1973 | Brockman et al. . |
| 4,012,112 | 3/1977 | Masterson .............................. 350/90 |
| 4,026,110 | 5/1977 | Engström ............................... 60/592 |
| 4,126,376 | 11/1978 | Gommel et al. ........................ 350/90 |
| 4,139,948 | 2/1979 | Tsuchiya et al. .................... 33/180 R |
| 4,270,838 | 6/1981 | Furusawa et al. ...................... 350/81 |
| 4,367,914 | 1/1983 | Mukasa ................................ 350/530 |
| 4,526,169 | 7/1985 | Narishige et al. .................... 128/303 |
| 4,579,009 | 4/1986 | Carmichael et al. ................... 73/863 |
| 4,615,592 | 10/1986 | Schob et al. .......................... 350/531 |
| 4,619,899 | 10/1986 | Nikitin et al. ........................ 435/287 |
| 4,624,537 | 11/1986 | Hanssen et al. ....................... 350/531 |
| 4,679,976 | 7/1987 | Narishige et al. ........................ 414/4 |
| 4,700,584 | 10/1987 | Narishige et al. ..................... 74/479 |

OTHER PUBLICATIONS

WPI–Huxley Micromanipulator Instructions (1984 or earlier).
Booklet–Narishige Micromanipulators.
Booklet–Servometer Miniature Metal Bellows and Electroforms.
Narishige 1987 Price List and Various Related Tear Sheets.
Two WPI Tear Sheets Regarding M757 and 10,000 Huxley–Style Micromanipulators.
A. F. Huxley "A Micromanipulator", J. Physiology, vol. 157, pp. 5P–7P (1961, London).
"Huxley–Goodfellow Micromanipulator", A Brochure From W.P. Instruments, Inc.
"Micromaripulators", Hacker Instruments. Inc., Nov. 1971.

*Primary Examiner*—David A. Bucci
*Assistant Examiner*—William M. Hienz
*Attorney, Agent, or Firm*—Amster, Rothstein & Ebenstein

[57] ABSTRACT

Remote control of a micromanipulator employs laterally inextensible metal bellows, connected by flexible tubing of constant internal diameter, in both the micromanipulator and the remote controller. Variations in the length of one bellows is communicated to the other bellows by variations in hydraulic volume, as opposed to variations in hydraulic pressure.

32 Claims, 11 Drawing Sheets

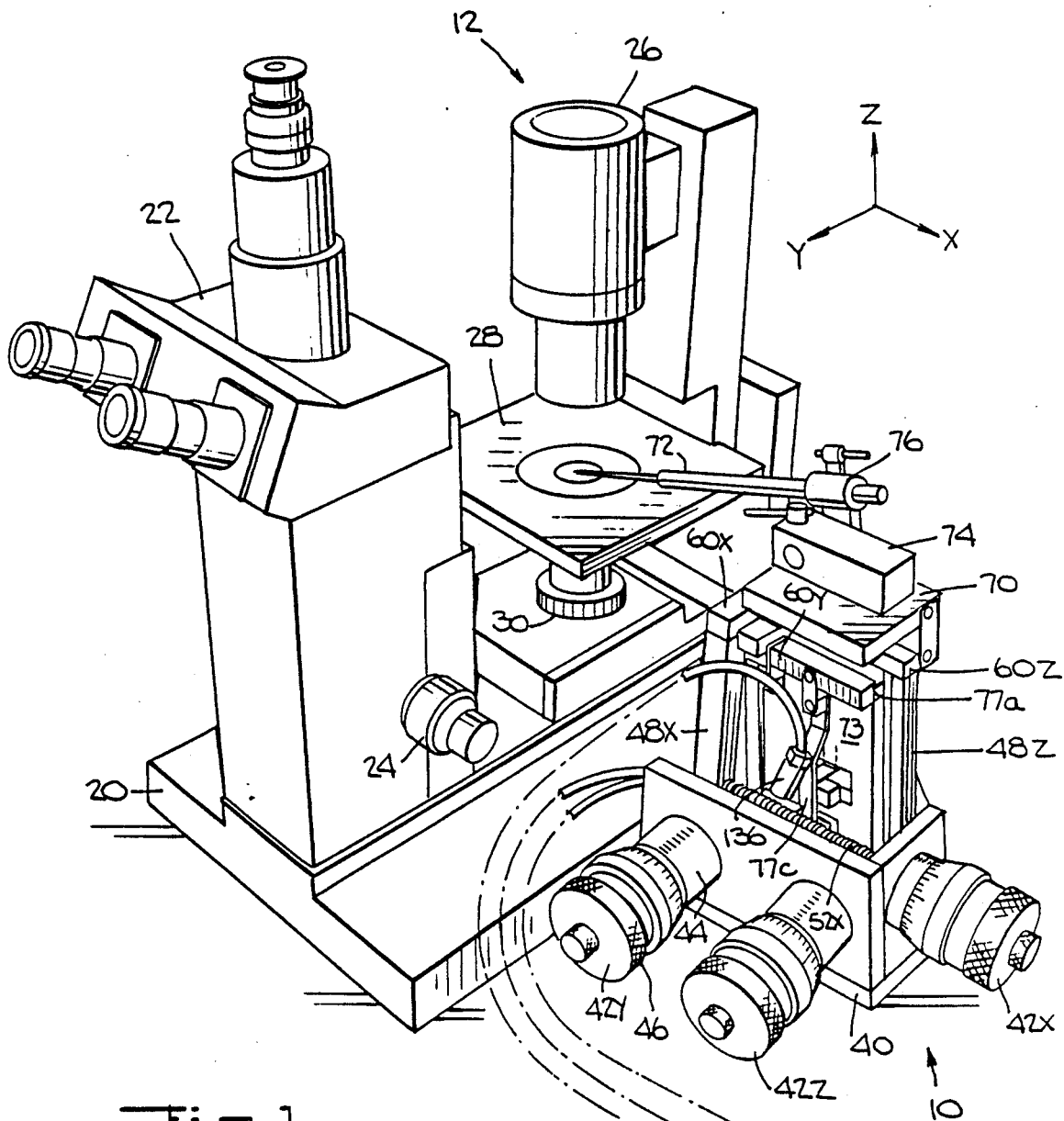
Fig. 1.
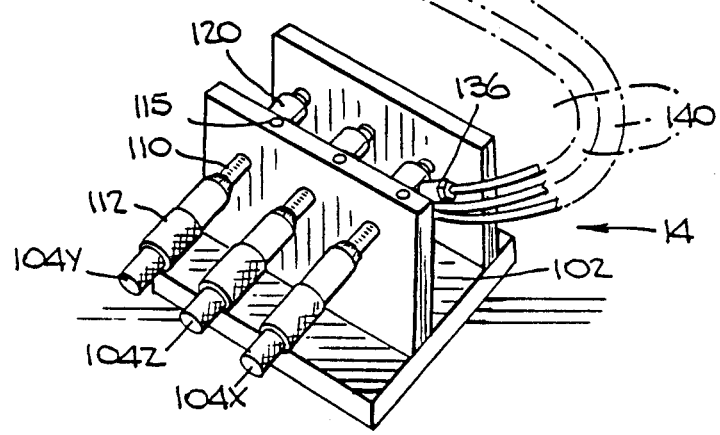

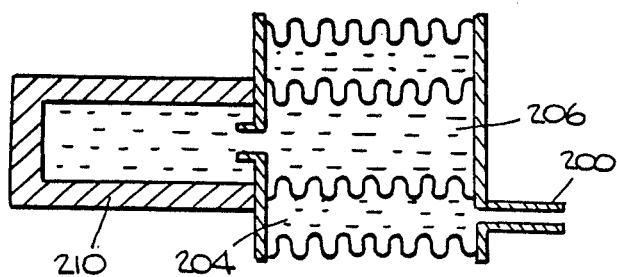
Fig. 13B.
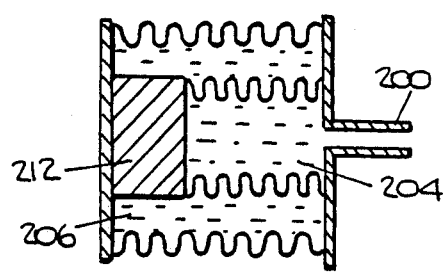
Fig. 13C.
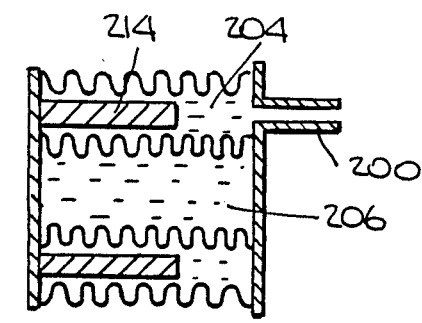
Fig. 13D.
Fig. 13A.
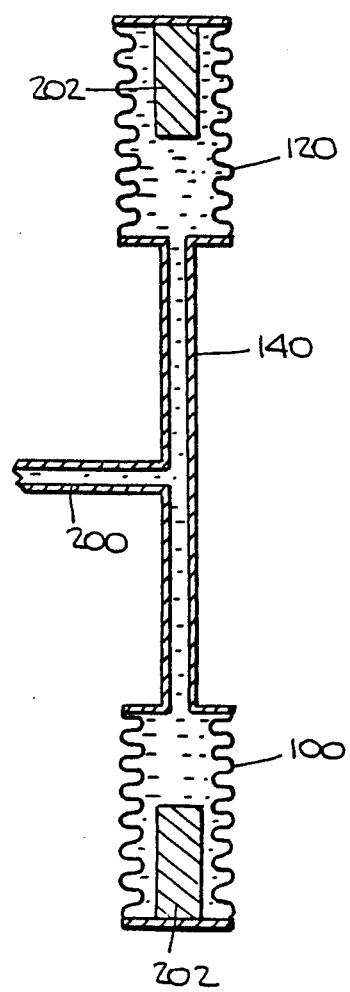

MICROMANIPULATOR USING HYDRAULIC BELLOWS

BACKGROUND OF THE INVENTION

The present invention relates to micromanipulators, and more particularly to Huxley-style micromanipulators and devices useful therein.

A common challenge in studying the physical properties of single cells is the stable and reproducible positioning of transducers. This situation occurs, for example, in force measurements on single cardiac cells or in voltage-clamp studies on dialyzed cells which require that electronics be combined with the suction micropipette holder. The experimental challenge is compounded when precise measurement of contractile shortening and electrical behavior are combined since convenient alignment of the optical sensor used in the former measurement requires that it be mounted separately from the mechanically isolated microscope system. In this example, it is advantageous to have a means for remote control of micromanipulation, and ideally this should not utilize conductive leads, which can introduce potential sources of electrical noise near the experimental preparation The micromanipulator designed by A.F Huxley has the ability to bear large weights in a stable fashion. It is an assembly of metals bars stapped together with pieces of spring metal that also serve as a weight-bearing fulcrum In principle, displacement of the micrometer drive by 2-5 $\mu$m is reduced at least fivefold by lever action, thus permitting precise and reproducible repositioning at the submicron level The manipulator's elegant and simple design enables the construction of suitable, relatively inexpensive models by researchers.

Nonetheless, the Huxley-style micromanipulator has not proven to be entirely satisfactory in practice. Its "footprint" is too large for particular applications due to the three large micrometers located in its base. Tilt of the axes of micromanipulation is achieved by tipping of the whole manipulator with an unavoidable resultant effect on the axial alignment of the fine control. Additionally, only three axes of control (that is, three degrees of freedom) are available. The layout of the micrometers dictates the provision of separate right- and left-handed models for right- and left-handed operators.

Remote control of the Huxley-style manipulator can be achieved by replacement of each of its three micrometer drives by stepping motors. This approach adds a major expense to the basic price of the micromanipulator, and it introduces electrical leads near the experimental system. Alternatively, a remote control using a hydraulic drive has been offered commercially, but this requires factory installation, adds significant space to the "footprint" of the unit, and cannot be retrofitted easily to many existing manipulators. Moreover, the hydraulic drive totally replaces the micrometer drive so that the original micrometer control is sacrificed to the remote controller.

Narishige U.S. Pat. Nos. 4,526,169; 4,679,976 and 4,700,584 disclose hydraulic control of a micromanipulator. The Narishige actuator is based on a rubberized deformable rolling diaphragm. The micrometer head is used as a means for transmitting a variation in hydraulic or hydrostatic pressure, with the variations in hydraulic pressure being transduced into displacements of a piston. As the hydraulic actuator is based on the confinement of a non-compressible fluid entrained between deformable membranes which roll and unroll, the relationship between micrometer input and output microtool position can be affected by hydrostatic pressure because the initial outward bulging of the membranes at the neutral position is oppositely related to the respective changes in the shape of the membranes as one piston advances and the other recedes.

In the most recent of the Narishige micromanipulators, the hydraulic cylinder is constituted by a cylinder body formed interiorly with a hydraulic chamber and rolling diaphragm. Displacement of a micrometer piston causes a variation of the force with which the piston presses the diaphragm. This causes a pressurizing or depressurizing of the hydraulic chamber within the cylinder body. The variation in pressure of the hydraulic chamber within the cylinder body is transmitted via a tube to the hydraulic cylinder of the pressure reception section of the moving arm, to thereby vary the pressure of the hydraulic chamber within the cylinder body of the moving section. For example, if the interior of the hydraulic cylinder is pressurized, the pressure in the hydraulic cylinder will increase, thereby causing the diaphragm to press the piston and move the lever arm.

Like the Huxley-style micromanipulators the Narishige micromanipulators have their limitations and have not proven to be entirely acceptable in use. While visual repositioning with a Narishige micromanipulator is good, "blind" repositioning is not as reproducible and investigators commonly experience significant drift. Because of the use of the rolling, flexible diaphragm, the dependency of the Narishige micromanipulator on the use of hydraulic pressure necessarily introduces potential sources of error. Changes in the pressure exerted on the output end of the micromanipulator (e.g., the microtool) are reflected in the hydraulic pressure within the micromanipulator and thus the positioning of the output end. For example, any change in the weight of the microtool held by the output end of the micromanipulator or any change in its effective weight (for example, as a result of an acceleration or deceleration of the microtool) will be reflected in the hydraulic pressure. While Narishige teaches the need for minimizing thermal effects on the hydraulic fluid through the use of a thermal fluid having a relatively low thermal coefficient of expansion and other means, no fully effective thermal compensation is provided Finally, any hydraulic coupling together of the Narishige actuators governing separate axes of control results in undesirable interaction between the actuators because the changes in pressure on the deformable membranes can cause the volume of a hydraulic chamber to be altered despite the fact that the piston in the driver actuator is held fixed by a micrometer.

Accordingly, it is an object of the present invention to provide a Huxley-type micromanipulator having remote control which is either added to the micrometer control without adding to the footprint of the micromanipulator or used as a substitute therefor so as to enable a smaller footprint for the micromanipulator.

Another object is to provide such a micromanipulator which can afford tilting of particular axes without tilting of the micromanipulator base, can provide more than three axes of control, and which do not require separate right- and left-handed versions.

A further object is to provide a micromanipulator utilizing hydraulic controls which are substantially insensitive within limits to the load place on the micromanipulator output, and which permit coupling, scaling, tilt, and additional degrees of freedom to be provided without interaction between hydraulic systems.

It is another object of the present invention to provide a device enabling automatic compensation for the thermal expansion of the fluid in the hydraulic control of a micromanipulator or like device.

It is also an object to provide a more compact Huxley-style micromanipulator.

SUMMARY OF THE INVENTION

It has now been found that the above and related objects of the present invention are attained in a micromanipulator having a hydraulic system in which variations in hydraulic volume are transduced to variations in linear motion. It will be appreciated that such a system differs in basic design from the Narishige hydraulic systems wherein variations in hydraulic pressure (rather than hydraulic volume) are transduced into piston displacements. The present invention employs a hydraulically-operated fluid-tight bellows member which is reversibly adjustable in length with a functionally substantially constant average cross-sectional area. The bellows member is metallic, preferably formed of electrodeposited nickel.

One aspect of the present invention is a micromanipulator for making precise, reproducible microadjustments of the position of a platform adapted to support a microtool for relative movement. The micromanipulator comprises a frame, a lever arm secured to the frame and adapted to functionally engage the platform, and a hydraulically-operated fluid-tight bellows member in operative engagement at one end with the frame and at the other end with the lever arm. Means are provided for reversibly supplying the bellows member with a substantially incompressible liquid to adjust the length of the bellows member, thereby effecting microadjustments to the position of the platform relative to the frame.

In a preferred embodiment the supplying means comprises a second frame, a second bellows member, a micrometer for reversibly adjusting the length of the second bellows member, and tubing connecting the second bellows member and the bellows member. The supplying means is part of a remote controller including a substantial length of flexible tubing of substantially constant average internal diameter connecting the remote controller and the bellows in fluid communication, the remote controller being adapted to be remotely disposed from the bellows member.

Another aspect of the present invention is a system comprising at least a pair of such micromanipulators, each of the micromanipulators sharing a common supplying means for proportionally adjusting the length of the bellows member thereof.

A further aspect of the present invention is the micromanipulator additionally including means coupled to the bellows member for adjustably positioning the bellows member, thereby effecting microadjustments to the position of the platform relative to the frame. Preferably the micromanipulator has a plurality of the lever arms, a like plurality of the positioning means, a like plurality of the bellows member, and a like plurality of the supply means. Each of the bellows members is in fluid communication with a respective supply means and is disposed with a first portion in engagement with a respective lever arm and a second portion coupled to a respective positioning means. The micromanipulator preferably adjusts the position of the platform orthogonally in three axes, each of the three bellows members being disposed intermediate a respective one of the positioning means and a respective one of the lever arms. The positioning means is a micrometer fixed to the frame and bearing on the bellows member, the length of the bellows member remaining substantially constant in response to manipulation of the positioning means.

Thus the present invention encompasses a micromanipulator for adjusting the position of a workpiece by remote control comprising a frame including a plurality of positioning means, each positioning means having a spindle and means for adjustably positioning said spindle. A plurality of lever arms are secured to the frame, each adapted to functionally engage the platform and a different one of the positioning means. A plurality of hydraulically-operated fluid-tight metallic bellows members are disposed with each of the bellows members being disposed intermediate a respective one of the spindles and a respective one of the lever arms. Each of the bellows members is adjustable in length with a substantially constant average cross-sectional area, the length of the bellows members remaining substantially constant in response to manipulation of the positioning means. Remote control means remotely supply substantially incompressible fluid to each of the bellows members to adjust the length thereof independently of each other to effect micromanipulation of the platform. Preferably each of the positioning means and each of the supplying means comprises a micrometer.

Yet another aspect of the present invention comprises a remote controller for a micromanipulator having a hydraulic control system for adjustably micropositioning a platform along a given axis in response to the supply of a substantially incompressible fluid to the hydraulic control system from the remote controller. The remote controller has a frame, and a bellows member of functionally constant effective cross-sectional area and reversibly adjustable length. The bellows member is secured to the frame and adapted to be in fluid communication with the hydraulic control system and filled with the fluid of the hydraulic control system. An associated positioning means is secured to the frame and bears on the bellows member to reversibly adjust the length thereof and thereby reversibly supply the fluid to the hydraulic control system of the micromanipulator. Preferably the remote controller is designed for a micromanipulator having three hydraulic control systems for adjustably positioning the platform along three orthogonal axes and has means for independently providing three orthogonal axes of control. The providing means comprises three of the bellows members and three of the positioning means, each of the positioning means being associated with a respective one of the bellows members and each of the bellows members being in fluid communication with a respective one of the hydraulic control systems.

The remote controller may be configured to provide special features for particular applications. Thus the remote controller may additionally include means for providing a fourth axis of control without interfering with the three orthogonal axes of control and without adding an additional hydraulic control system to the micromanipulator. Such a means for providing a fourth axis of control comprises three additional bellows members secured to the frame and disposed in parallel with the respective ends of each joined together for movement as a unit. Each of the additional bellows members is in fluid communication with a respective one of the three original bellows members. A fourth positioning means is secured to the frame and bears on the three additional bellows members to reversibly adjust the lengths thereof and thereby reversibly supply fluid to the hydraulic control systems of the micromanipulator.

The remote controller may additionally include means for providing tilt to two orthogonal axes of control without interfering with the three orthogonal axes of control. Such a means for providing tilt to two orthogonal axes of control comprises fourth and fifth bellows members in parallel with the first and second bellows members, with the respective ends of the first and fourth bellows members and the second and fifth bellows members being joined together in pairs for movement as a unit. A reversing bellows assembly functionally interconnects the second and fourth bellows members, the first and fifth bellows members being in fluid communication and the second and fourth bellows members being in functional fluid communication through the reversing bellows assembly.

The remote controller may additionally include means for variably scaling the volume of the fluid effectively transmitted from the bellows member thereof to the hydraulic control system of the micromanipulator. Such a scaling means comprises a pair of additional bellows members of differing functional cross-sectional area disposed in series with the common ends joined together for movement as a unit and the free ends secured to the frame. A valve is adjustable between a bypass position wherein the fluid bypasses both additional bellows members, a downscaling position wherein the remote controller is in fluid communication with the additional bellows member of greater cross-sectional area and the additional bellows member of lesser cross-sectional area is in fluid communication with the micromanipulator, and an upscaling position wherein the remote controller is in fluid communication with the additional bellows member of lesser cross-sectional area and the additional bellows member of greater cross-sectional area is in fluid communication with the micromanipulator. Thus in the downscaling position a given volume of the fluid from the remote controller enters the free end of the additional bellows member of greater cross-sectional area and a lesser volume of fluid leaves the free end of the additional bellows member of lesser cross-sectional area towards the micromanipulator, while in the scaling position a given volume of the fluid from the remote controller enters the free end of the additional bellows member of lesser cross-sectional area and a greater volume of fluid leaves the free end of the additional bellows member of greater cross-sectional area towards the micromanipulator.

The remote controller may further include means for connecting the remote controller to a plurality of the micromanipulators to effect linked movement in each. The connecting means comprises the bellows member and a second bellows member, both secured to the frame and disposed in parallel with the respective ends of each joined together for movement as a unit. Means connect each of said bellows members in fluid communication with the hydraulic control system of its respective micromanipulator. The bellows member and second bellows member preferably have identical effective cross-sectional areas so the linked movements are identical.

The remote controller may further include means for compensating for thermal compression and expansion of the fluid in the hydraulic control. The compensating means comprises a pair of additional bellows members of equal effective cross-sectional area disposed in parallel, with the respective ends of each being joined together for movement as a unit. One of the additional bellows members is a line bellows member in fluid communication with the hydraulic control, and the other of the additional bellows members is a compensating bellows member isolated from the hydraulic control and containing an excess of fluid relative to the line bellows member. Thus a change in the length of the compensatory bellows member due to thermal expansion or contraction of the fluid therein results in an at least partially compensatory change in the length of the line bellows member to accommodate the thermal expansion or contraction of fluid in the hydraulic control.

The compensating bellows member may operatively include an inextensible reservoir, the excess of fluid being stored in the reservoir. Alternatively, a volume reduction plug may be disposed in the line bellows member, or the line bellows member may operatively include at one end thereof and as part thereof a volume reduction plug. Preferably the reservoir or volume reduction plug has a volume equal to the volume of fluid in the hydraulic control so that the excess of fluid is substantially equal to the volume of fluid in the hydraulic control. The pressure in the volume of fluid in the hydraulic control is constant.

The apparatus for compensating for thermal compression and expansion of a fluid in a hydraulic control may exist apart from the remote controller and indeed has utility apart from a micromanipulator environment.

Finally the present invention further encompasses a micromanipulator system for making precise, reproducible microadjustments in three orthogonal axes of the position of a micromanipulator platform adapted to support a microtool for relative movement, comprising a compact micromanipulator and a remote controller. The compact micromanipulator is characterized by an absence of micrometers and includes a frame and, for each axis, a lever arm adapted to functionally engage the platform and a hydraulically-operated fluid-tight bellows member reversibly adjustable in length with a substantially constant average cross-sectional area. The bellows member has one end fixed against axial displacement in one direction and the other end operatively bearing in the opposite direction against the lever arm. The bellows member is fixed in a horizontal plane irrespective of displacements by the micromanipulator in any axis. The remote controller includes means for reversibly supplying the bellows member of the micromanipulator with a substantially incompressible liquid to adjust the length of the bellows member, thereby effecting microadjustments to the position of the platform.

BRIEF DESCRIPTION OF THE DRAWING

The above brief description, as well as further objects and features of the present invention, will be more fully understood by reference to the following detailed description of the presently preferred, albeit illustrative, embodiments of the present invention when taken in conjunction with the accompanying drawing wherein:

FIG. 1 is a perspective view of a remote controlled micromanipulator according to the present invention shown positioning a micropipette in the field of a microscope;

FIG. 13 is a schematic view of apparatus for compensating for thermal expansion and contraction of fluid in a hydraulic control with FIG. 13A showing the hydraulic control and FIGS. 13B, C and D showing alternative compensating mechanisms.

DETAILED DESCRIPTION OF THE PREFERRED EMBODIMENTS

Figure 2:
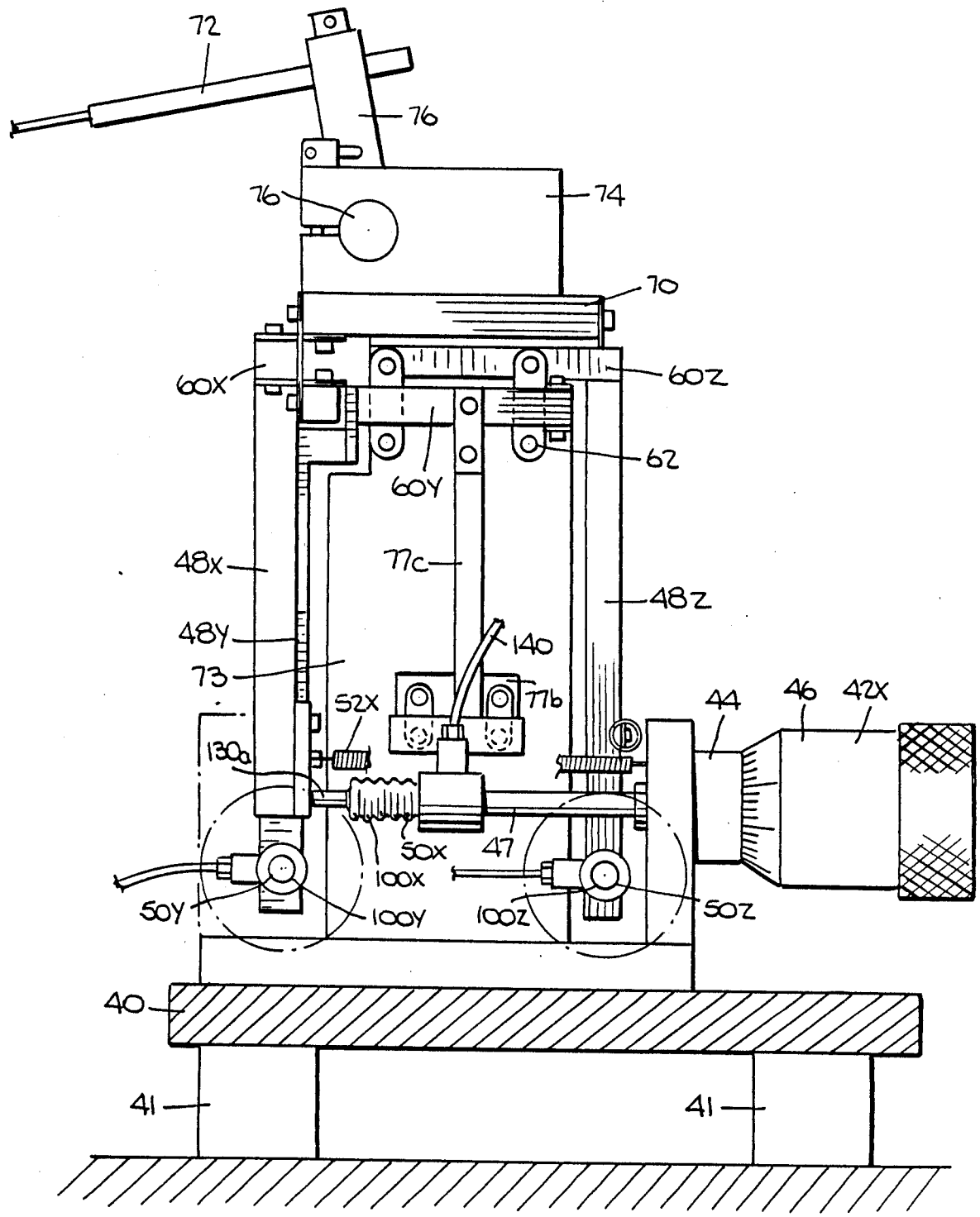
FIG. 2 is a side elevation view, partially in cross-section, of the micromanipulator unit.
Figure 3:
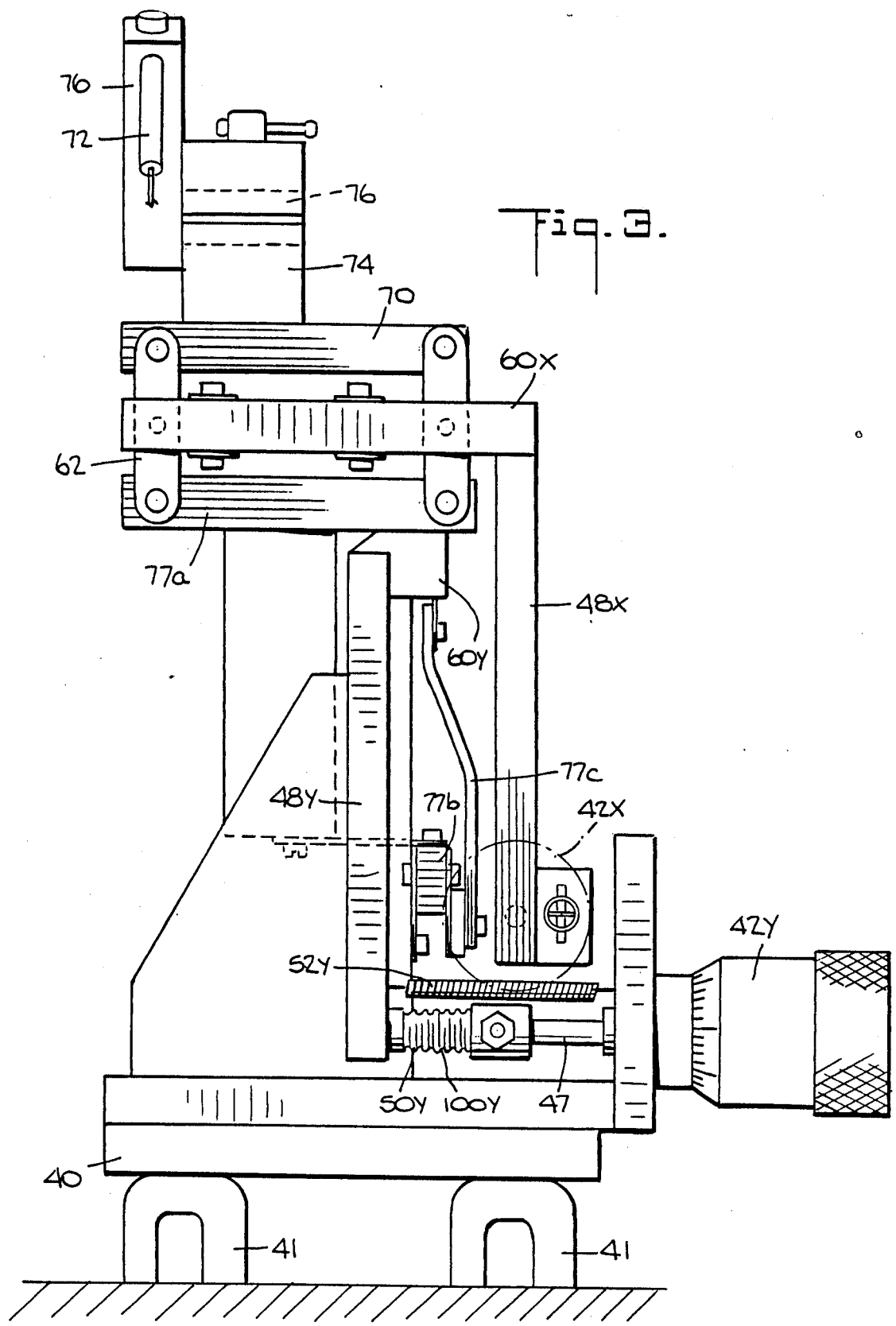
FIG. 3 is an end elevation view thereof, partially in cross-section.

Referring now to the drawing, and in particular to FIGS. 1–3 thereof, therein illustrated is a micromanipulator according to the present invention, generally designated by the reference numeral 10. Also illustrated in FIG. 1 are an inverted microscope, generally designated 12, and a remote controller, generally designated 14, for the micromanipulator. It will be appreciated that the inverted microscope is not a part of the present invention and is only representative of the various types of apparatus with which a micromanipulator may be productively employed, such as laser optics, micropositioning of semiconductor masks and the like in microelectronics, etc. The inverted microscope 12 includes a frame or base 20 having disposed thereon a trinocular headpiece 22 (the third eyepiece typically being used for a camera or the like), with focus control knobs 24, an illuminator or lamp assembly 26 for illuminating the stage 28 from above, and a lens assembly 30 for viewing the stage 28 from below. The microscope may or may not further include means for moving the stage 28 horizontally relative to the lens 30. As the microscope 12 is merely illustrative of the environment in which the micromanipulator may be utilized, no further elaboration thereon is deemed necessary.

The micromanipulator 10 is of the Huxley-type comprised of an assembly of metal bars strapped together with pieces of spring metal that also serve as a weight-bearing fulcrum in the fashion of a hinge. The frame or base 40 of the micromanipulator 10 may be flat or supported on magnets 41 to facilitate fixing of the position of the micromanipulator on a metal surface. The frame 40 supports three large micrometers 42, a micrometer 42X disposed along one axis and two micrometers 42Y and 42Z disposed transversely thereto in the same horizontal plane. The X-axis micrometer 42X effects adjustment by the micromanipulator along the X-axis, the Y-axis micromanipulator 42Y effects adjustment along the Y-axis, and the Z-axis micromanipulator 42Z effects adjustment along the Z-axis. Each micrometer 42 is of conventional design including a stationary body 44, a head 46 rotatable relative to the body 44 and a spindle 47 which is longitudinally reciprocatable according to the rotation of the head 46 relative to the body 44. The micrometer 42 may be of the rotating or non-rotating spindle type as desired, the non-rotating type being illustrated.

Each of the micrometers 42X, 42Y, 42Z functionally engages the bottom end of a pivotable, generally vertically disposed lever arm 48X, 48Y, 48Z, respectively, by means of a generally horizontally disposed connecting member 50X, 50Y, 50Z, respectively, substantially axially aligned with the micrometer spindles. To ensure that the bottom ends of the lever arms 48X, 48Y, 48Z remain in functional engagement with the connecting members 50X, 50Y, 50Z even when the micrometers 42X, 42Y, 42Z are rotated to withdraw the spindles 47 therefrom, backlash extension springs 52X, 52Y (and a third which would correspond to 52Z, if shown) connect the respective lever arms 48X, 48Y, 48Z to the frame 40 adjacent the heads 46 of the respective micrometers 42X, 42Y, 42Z.

Figure 7:
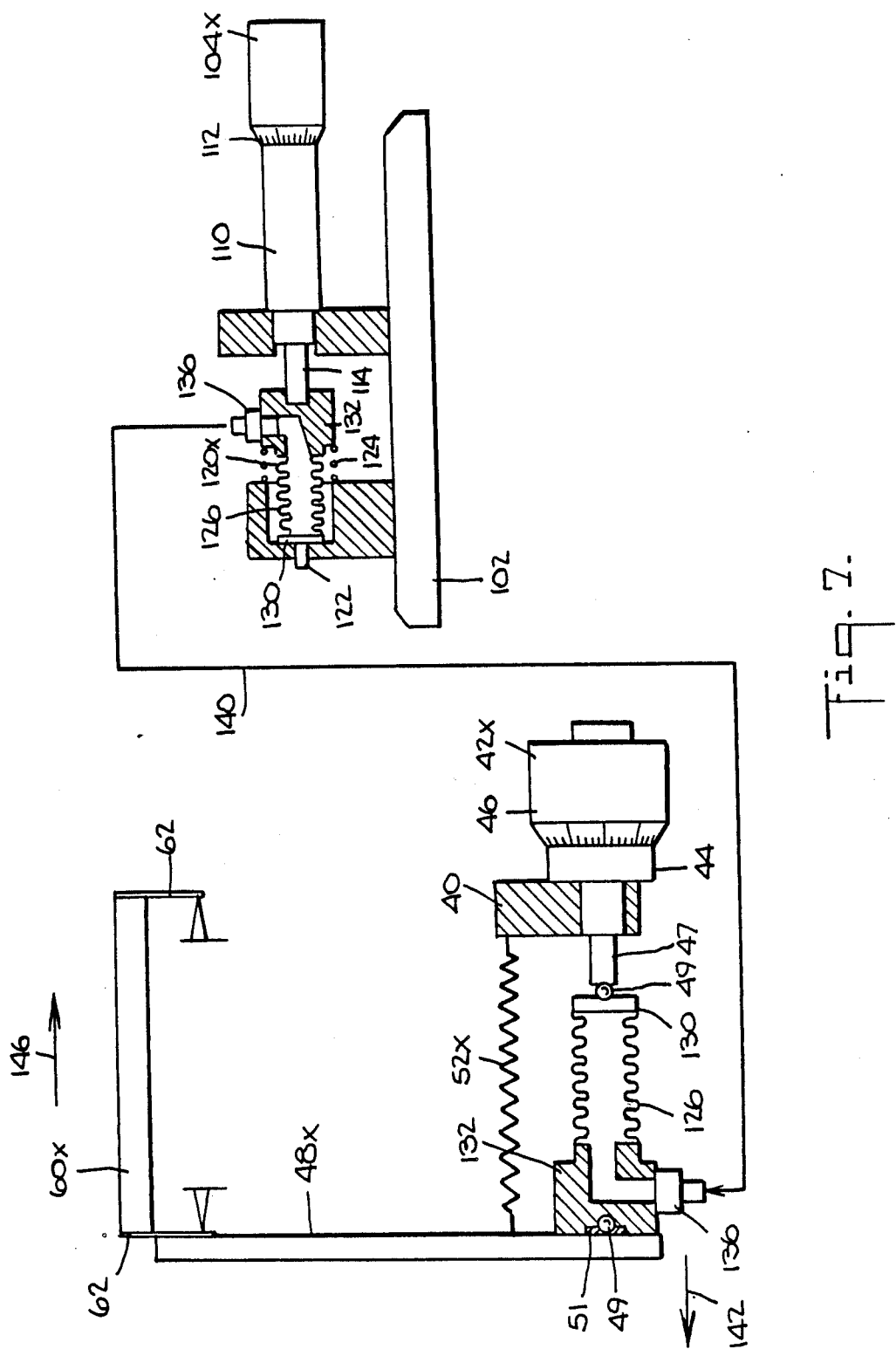
FIG. 7 is a schematic view of FIG. 6 with a minor variation.

The adjacent facing surfaces of each lever arm 48 and connecting member 50 are dimpled to receive therebetween a ball bearing 49 which makes a functional point-to-point contact between the lever arm 48 and the connecting member 50 so that the lever arm 50 is able to tilt as required in response to movement of one end of the connecting member 50 without also tilting the connecting member 50 and thereby varying its effective length along an axis. The other end of the connecting member 50 is seated on the non-rotating spindle 47 of the micrometer 42. In the event that a micrometer 42 with a rotating spindle 47 is used, as shown in FIG. 7, a similar dimple and ball bearing arrangement is employed between the rotating spindle 47 of the micrometer 42 and the adjacent end of the connecting member 50 in order to minimize the transmission of rotation from the rotating spindle 47 to the connecting member 50. In this arrangement, however, the ball bearing 49 making the point-to-point contact between the connecting member 50 and the lever arm 48 may be surrounded by a washer 51 to assist in maintaining the ball bearing 49 in position, the point-to-point contact between the rotating spindle 47 and the connecting member 50 in this instance accommodating movement of the lever arm 48 with only minor tilt of the connecting member 50.

The upper end of each lever arm 48X, 48Y, 48Z is rigidly connected to a horizontally extending control bar 60X, 60Y, 60Z, each control bar 60 being constrained by a plurality of leaf springs 62 to rotational motion about its axis. The amount of tilting or partial rotation of any given control bar 60 about its axis is, of course, reduced by the negative lever advantage provided by the associated lever arm 48 relative to the motion of the associated micrometer spindle 48. The tilting of each control bar 60X, 60Y, 60Z is reflected in the motion of a top plate or platform along the X, Y and Z axes.

The top plate 70, in turn, functionally engages a microtool 72, such as a micropipette, microelectrode or other workpiece, for movement as a unit by the micromanipulator via a connector 74 secured to the top plate for movement therewith and a microtool holder 76 adapted to receive the microtool 72 and to be locked into the connector 74 for movement therewith. If desired, there may be disposed intermediate the top plate 70 and microtool 72 a conventional fixture enabling coarse position adjustment of the microtool 72 relative to the top plate 70 in at least one axis and generally independently in each of the X, Y and Z axes.

The precise mechanisms by which the tilting of the control bars 60X, 60Y, 60Z effectuate motion of the platform or top plate 70 along the X, Y, Z axes are well to known to those familiar with Huxley-type micromanipulators and hence need not be expounded further at this point. The Y-axis control bar 60Y is attached by leaf springs 62 to the upstanding central support plate 73 which is a rigid upward extension of the base plate 40 of the manipulator. An auxiliary Y-axis control bar 77b is likewise attached to the central support plate 73, and the rotations of the two Y-axis control bars 60Y, 77b are linked via leaf springs 62 and the Y-axis linking bar 77c. The Y-axis control bar 60Y is attached by leaf springs 62 to the Z-axis control bar 60Z, and the latter control bar 60Z suspends the horizontal stabilizing plate 77a by leaf springs 62. A downward vertical extension 77d of the horizontal stabilizing plate 77a is attached to the auxiliary Y-axis control bar 77b by leaf spring 62.

When rotation of the Z-axis control bar 60Z is prevented by fixation of its associated lever arm 48Z, the ensuing connections by leaf springs 62 between the Y-axis control bar 60Y, the Z-axis control bar 60Z, the horizontal stabilizing plate 77a, 77d, the auxiliary Y-axis control bar 77b and the Y-axis linking bar 77c constitute a parallelogram. Displacement of the ends of the Y-axis lever arm 48Y by the Y-axis connecting member 50Y rotates the Y-axis control bar 60Y. This rotation is transferred directly to the auxiliary Y-axis control bar 77b, thus displacing the horizontal stabilizing plate 77a horizontally by parallelogram action.

When rotation of the Y-axis control bar 60Y is prevented by fixation of its associated lever arm 48Y, rotation of the Z-axis control bar 60Z displaces the horizontal stabilizing plate 77a in the vertical direction, also by parallelogram action. The top plate 70 of the manipulator is attached by leaf springs 62 to the horizontal stabilizing plate 77a, so that displacement of the latter is directly converted into motion for micromanipulation in the Y and Z-axes.

The X-axis control bar 60X is suspended by leaf springs 62 between the top plate 70 and the horizontal stabilizing plate 77a, so that rotation of the X-axis control bar 60X caused by movement of the free end of its lever arm 48X effects horizontal displacement of the top plate 70 alone by parallelogram action.

Reverse angular rotation of the control bars 60 is prevented by the fixation of the lever arms 48 by the respective micrometers 42 acting through the connecting members 50.

In the original Huxley-style micromanipulator, each of the connecting members 50X, 50Y, 50Z is a fixed length rod. According to the present invention, however, each of the connecting members 50X, 50Y, 50Z is a variable length bellows member 100X, 100Y, 100Z to be described in further detail hereinafter. As a connecting member 50, each bellows member 100 is in operative engagement at one end with an associated lever arm 48 and at the other end with an associated micrometer spindle 47 or other positioning means Where the bellows 100 is provided with a fixed supply of substantially incompressible fluid, the length of the bellows 100 is fixed, and the bellows 100 is functionally identical to the connecting rod of fixed length used in the original Huxley-type micromanipulator. On the other hand, where the bellows 100 is reversibly supplied with a substantially incompressible fluid so that there is a varying quantity of the fluid in the bellows 100, the length of the bellows 100 varies, this having the effect of a change in the setting of the associated micrometer 42 and hence effecting microadjustments to the position of the platform or top plate 70.

It will be appreciated that the use of the bellows 100 adds another layer of control to the original Huxley-style manipulator, the control imparted by a bellows 100 being additive to the control imparted by the micrometer 42, rather than a substitute therefor. As will be brought out in further detail hereinafter, the introduction of hydraulic controls into the micromanipulator enables the employment of a variety of different procedures adding to the flexibility of the micromanipulator including remote control, scaling, coupling, additional axes of control, tilt, and the like.

Figure 4:
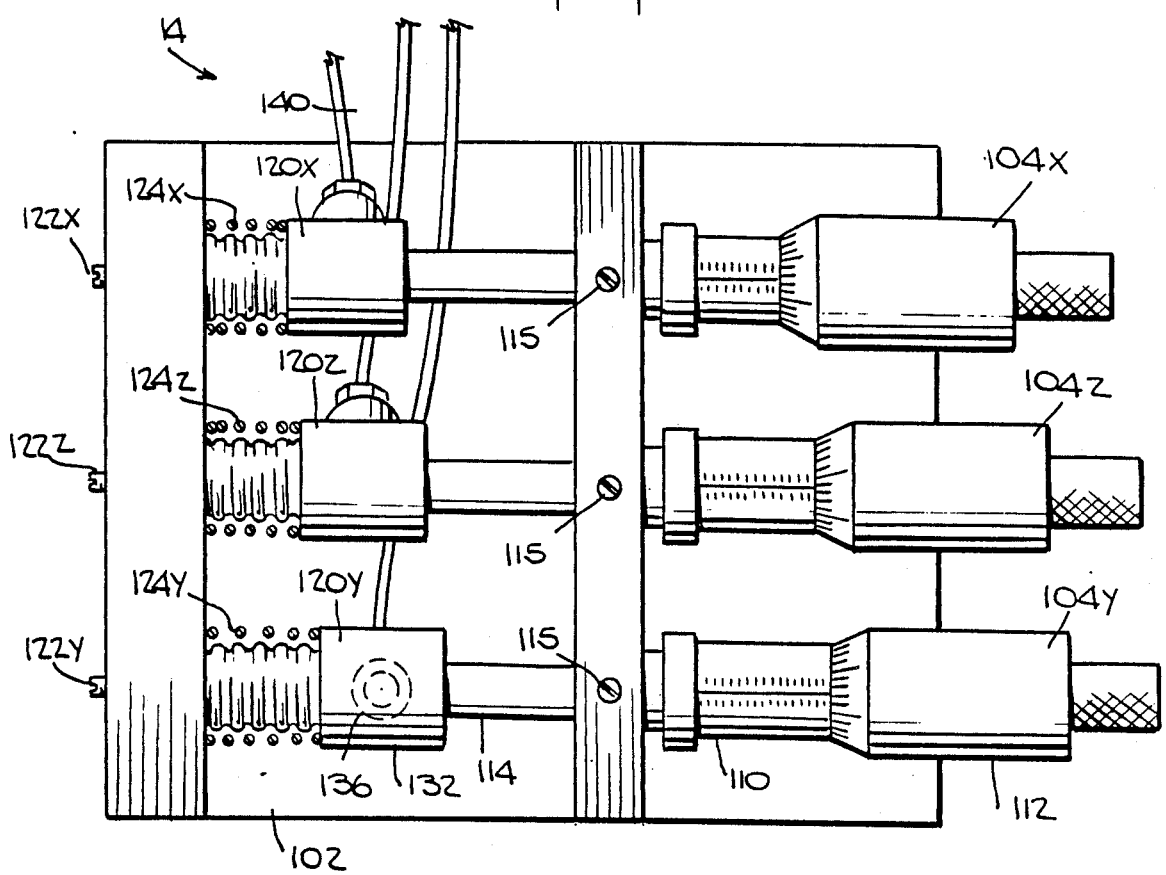
FIG. 4 is a top plan view, to an enlarged scale, of the remote control unit.
Figure 5:
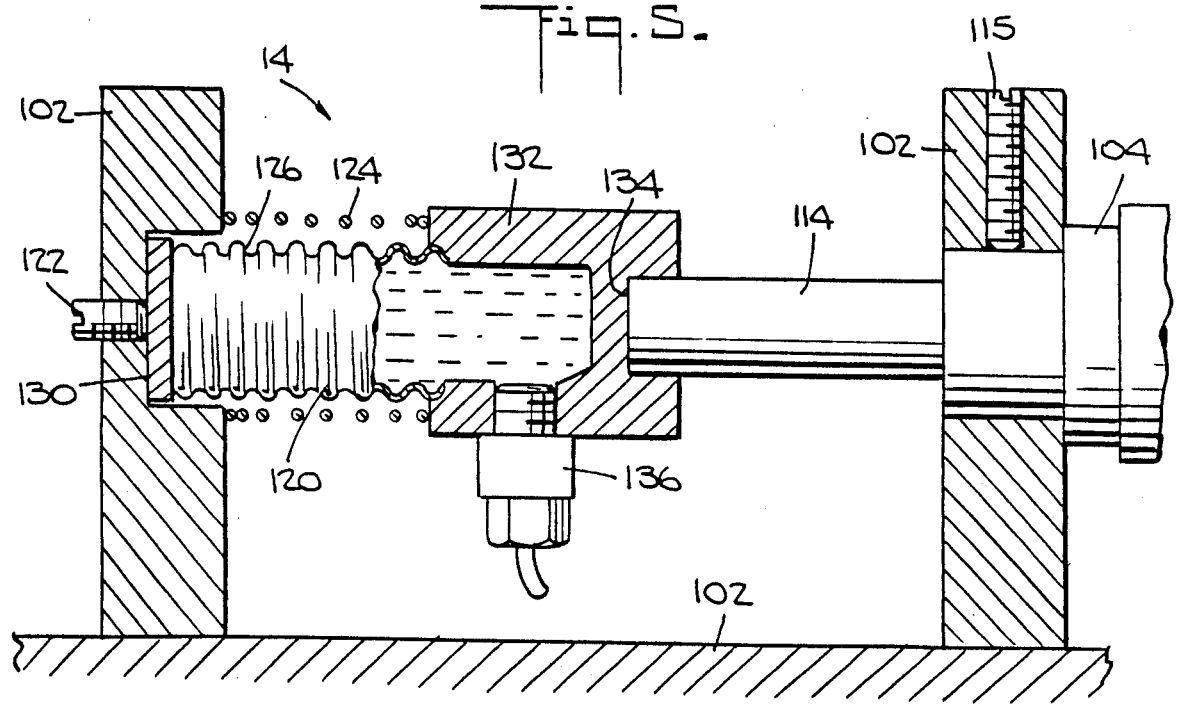
FIG. 5 is a side elevation view, partially in section and to an enlarged scale, of a bellows units of FIG. 4, with portions thereof being cut away to reveal details of internal construction.

Referring now to FIGS. 1, 4 and 5, the remote controller 14 comprises a frame 102 and a plurality of micrometers 104X, 104Y, 104Z, conveniently arranged in parallel to facilitate one handed operation by either right- or left-handed persons. The micrometers 104 are of the non-rotating spindle type and are comprised of stationary bodies 110, rotatable heads 112 and non-rotating spindles 114. Set screws 115 fix the stationary bodies 110 of the micrometers 104 to the frame 102 and preclude relative rotation therebetween. The spindles 114 of the micrometers 104X, 104Y, 104Z bear on one end of the respective remote control bellows 120X, 120Z, 120Y to be described in further detail hereinafter. The other end of each bellows 120 is journaled in the frame 102 to prevent tipping or tilting thereof and abuts the tip of a respective adjustable set screw 122X, 122Y, 122Z. The set screws 122 enable adjustment of the initial extension of the bellows 120 to a desired reference point on the radial markings of the micrometer shaft 110. A spring 124X, 124Y, 124Z is disposed about a portion of the exterior of an associated bellows 120X, 120Y, 120Z and acts to bias the bellows 120 against the micrometer spindle 114 (although this is optional as the bellows 120 is ordinarily extended by pressure from the micromanipulator backlash springs 52).

The remote controller 14 has a low profile which permits stacking of one remote controller 14 upon another. The micrometers 104 are preferably closely spaced together to enable rapid control of all three axes of motion to be achieved without the hand having to leave the remote controller 14. If desired, however, the axes of the micrometers 104 may be disposed orthogonally to correspond to the three orthogonal axes of motion.

Turning now to the details of construction of the bellows 100 of the micromanipulator 10 and the bellows 120 of the remote controller 14, the bellows 100 and 120 have in common a convoluted or pleated cylindrical portion 126 fitted with end caps or end plates 130, 132, as best seen in FIG. 5. The convoluted or pleated cylindrical portion 126 of each bellows is a durable and inexpensive stock item available from Servomotor of Cedar Grove, NJ. These items are preferably metal plated, optimally made of electrodeposited nickel, and are available in a variety of different lengths and diameters (cross-sectional areas which are integral multiples of each other being available). The desired lengths and diameters of the items will vary with the available space in the micromanipulator 10 and the remote controller 14 as well as the particular function the bellows is to perform. The manufacture specifies that the minimum life expectancy of the item is 100,000 cycles.

The open ends of the convoluted or pleated cylinder portion 126 are sealed to rigid end plates 130, 132—for example, the cylinder ends are soldered to machined steel end pieces using a hot plate to insure uniform heating and sealing of the acid-free soldered joint. The smaller end piece 130 of each bellows has a small dimple that permits, in the case of the micrometer bellows 100, a ball-bearing point-to-point contact with an associated lever arm 48 of the manipulator 10, or, in the case of the remote control bellows 120, a centered contact with a set screw 122 for initial adjustment of the remote controller micrometer mounting, as earlier noted. The larger end piece 132 defines at the free end thereof a seat 134 for the free end of the micrometer spindle 47 of the manipulator micrometer 42 or the micrometer spindle 114 of the remote controller micrometer 104, as illustrated in FIG. 5. In the event that the manipulator micrometer 42 is of the rotating spindle type, the larger end piece 132 may be provided with a recess so that a washer 51 may surround the ball-bearing 49 intermediate the bellows 100 and the lever arm 48, as shown in FIG. 7. In this event, the bellows 100 is inserted in position with the small end piece 130 making point-to-point contact with the micrometer spindle 47 through a ball bearing 49 and the large end piece 132 making contact with the lever arm 48 through the washer 51 and ball bearing 49.

A metal adapter plug 136 is sealed into a side hole tapped into the larger end piece 132, optionally using a sealant. Fluid connection between the plug 136 of each micrometer bellows 100X, 100Y, 100Z and the associated plug 136 of each remote control bellows 120X, 120Y, 120Z is effected by a suitable length of flexible tubing 140X, 140Y, 140Z of substantially fixed internal diameter such as Teflon tubing (0.08 mm ID by 1.5 mm OD), using appropriate fluoropolymer tube fittings and a pair of female to male adapters.

It will be appreciated that where the bellows 100 is not of appropriate length to substitute for the connecting rod of the original Huxley-type manipulator, as may be the case with the X-axis bellows 100X, the smaller end plate 130 may include an extension rod 130a (see FIG. 2) bridging the distance between the lever arm 48 and the adjacent end of the bellows 100, the free end of the extension 130a being dimpled to enable point-to-point contact with the lever arm 48. The various fittings referenced above are standard fittings for high performance liquid chromatography and are obtainable from standard sources such as Alltech Associates (Applied Science Lab, Deerfield, IL).

A convenient size for the pleated or convoluted cylindrical portion 126 of the manipulator bellows 100 is 0.500 in. OD by 0.590 in. long (Servomotor size FC-10), while a convenient size for the same portion 126 of the remote controller bellows 120 is 0.375 in. OD by 0.740 in. long (Servomotor size FC-5). With these sizes, the manipulator bellows 100, because of its greater cross-section, reduces displacement of the remote controller bellows 120 by 0.56. An initial 5:1 reduction of displacement by the leverage in the original Huxley-style manipulator thus converts repositioning from the 10-um index on the shaft of the remote controller micrometer 104 to about a 1-um displacement of the platform 70 of the micromanipulator 10.

Proper operation of the remote controller requires that the remote controller bellows 120, the manipulator bellows 100, and the tubing 140 connecting the two bellows 100, 120 be filled with a substantially incompressible fluid. Standard substantially incompressible hydraulic fluids may be utilized. Preferably the fluid exhibits a low thermal coefficient of expansion and contractions, especially if the remote control is not provided with thermal compensating mechanisms such as that described hereinbelow. Estig 42 hydraulic oil (available from Exxon) is generally suitable. The fluid may be inserted into the bellows 100, 120 using a standard 20-gauge hypodermic needle, with the holes provided in the metal adapter plugs 136 being enlarged as necessary. Once the plugs 136 are filled with the fluid, the tubing 140 may be filled and the tubing ends connected to the bellows 100, 120, preferably after a slight pumping of the bellows to evacuate the last remaining air pockets. The remote controller bellows 120 is then disposed in the remote controller 14, and its associated micrometer is advanced to the point where displacement occurs in the free bellows 100 intended for insertion into the micromanipulator. At this neutral point, where the hydraulic coupler composed of the two bellows 100, 120 and connecting tubing 140, is under minimal stress, the set screw 122 in the remote controller 14 can finally be adjusted to zero the appropriate radial index marking on the micrometer shaft associated with the remote controller bellows 120. The free bellows is then inserted onto the spindle 47 of the manipulator micrometer 42, and the backlash spring 52 is finally reconnected to the lever arm 48 without compression of the hydraulic coupler from its neutral position.

As long as the pleated or convoluted cylindrical portions of the bellows are not subjected to forces exceeding the buckling limitations, the hydraulically-operated fluid-tight bellows 100, 120 are functionally substantially constant in average cross-sectional area (i.e., average internal diameter) as well as reversibly adjustable in length. In other words, the bellows are for practical purposes laterally inextensible, with the cross-sectional area being substantially constant on an averaged basis taking into account the convoluted or pleated nature of the portion 126. As the flexible tubing 140 connecting the bellows 100, 120 is also of substantially constant average internal diameter, any change in length of the remote controller bellows 120 as a result of the adjustment of its associated micrometer 104 will effect a proportional variation in the length of the micrometer bellows 100. Where the bellows 100, 120 have the same substantially constant average cross-sectional area, the two bellows will undergo identical changes in length. Thus the two bellows 100, 120, in conjunction with the connecting tubing 140, form a hydraulic coupler offering a fundamentally linear relationship between input and output hydraulic displacements. Accordingly, the present design avoids many of the problems associated with the Narishige-type micromanipulator which relies on hydraulic pressure rather than hydraulic increments in order to effect displacements. For example, where the remote controller micrometer 104 is held constant, pressure exerted on the manipulator bellows 100 by a manipulator micrometer 42 or a microtool 72 will not appreciably vary its length.

Advantages of the remote controller of the present invention relative to the replacement of the manipulator micrometers with stepping motors are the electrical and vibrational isolation of the micromanipulator, the retention of the micrometer adjustment capability and the reduced costs (about 1/9). However, it will be appreciated that where stepping motor control is desired, the micrometers of the remote controller may be replaced by stepping motors, still without sacrificing the electrical and vibrational isolation of the micromanipulator or the original micrometer adjustment capability. Repositioning by means of the remote controller avoids manual contact with the micromanipulator micrometers and thus avoids the otherwise unavoidable transient displacements of the mechanically isolated micromanipulator relative to the remainder of its environment—for example, the inverted microscope. The original Huxley-style micromanipulator can be retrofit to accept a remote controller of the present invention in a matter of minutes simply by substituting the bellows 100 for the connecting member 50 of the original micromanipulator. Blind repositioning of the microtool by micrometer settings alone is typically well within the limit set by the micrometer indices of the remote controller.

Figure 6:
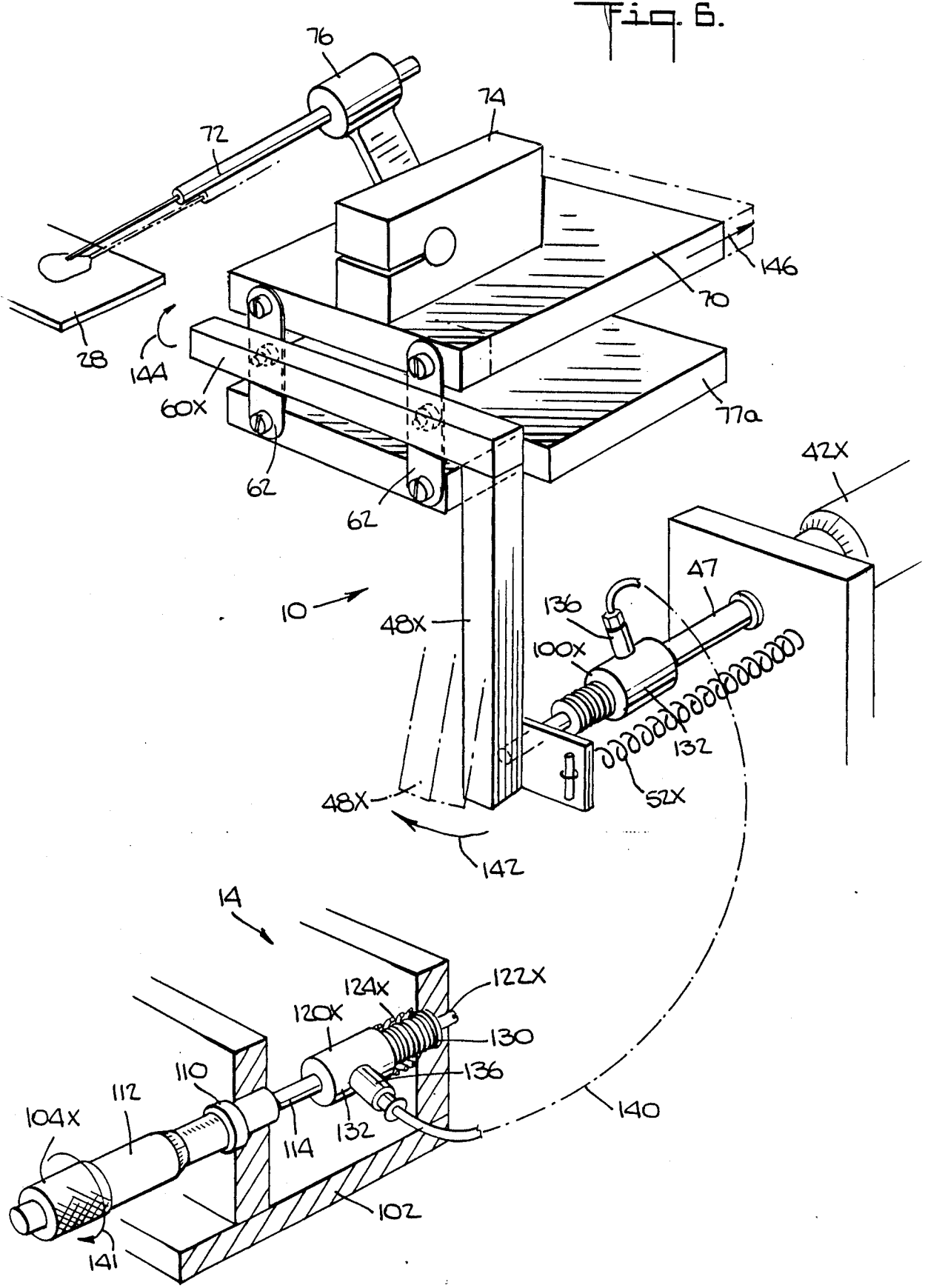
FIG. 6 is an isometric view of the remote controlled micromanipulator showing only the components thereof necessary for motion along the X-axis.

Referring now to FIGS. 6 and 7, therein illustrated is the remote controlled micrometer of the present invention, as it relates to X-axis motion. Elements related to motion along the Y- and Z-axes, but not necessary to illustrate operation of the invention with respect to motion along the X-axis, have been eliminated to clarify the principles of operation. Rotation of the handle 112 of the X-axis micrometer 104X of the remote controller 14 in the direction of arrow 141 causes movement of the micrometer spindle 114 forwardly relative to remote controller frame 102. (The spring 124 extending between the remote controller frame 102 and the larger end piece 132 of the remote controller bellows 120 insures continual engagement of the bellows larger end piece 132 with the remote controller micrometer spindle 114). As a direct result of the advancement of the micrometer spindle 114 towards the bellows 120X, the larger end piece 132 of the remote controller bellows 120X moves forwardly to vary the length of the bellows 120, and in particular the pleated or convoluted cylindrical portion 126 thereof, this resulting in fluid being expelled into the adapter plug 136 of the remote controller bellows 120. The fluid transmitted along tubing 140 enters the adapter plug 136 in the larger end piece 132 of the micromanipulator bellows 100 and varies the supply of fluid therein, thus increasing it in length. An increase in the length of the micromanipulator bellows 100 effects a retreating rotation of the generally vertical X-axis lever arm 48X, as shown by the arrow 142. (Similarly, a decrease in bellows length results in an advancing counterrotation of the X-axis lever arm 48X under the influence of spring 52X which causes lever arm 48X to bear on the bellows 100X, and more particularly the extension rod 130a thereof). The rotation of lever arm 48X causes a corresponding rotation of the horizontal X-axis control bar 60X, in the direction of arrow 144, and the bearing of the edge of the control bar 60X on the leaf springs 62 displaces the top plate or platform 70 in the direction of the arrow 146. Motion of the top plate 70 effects, through connector 74 and microtool holder 76, a corresponding motion of the microtool 72 along the X-axis relative to the stage 28 of the inverted microscope.

It will be appreciated that the hydraulic couplers of the present lend themselves to alternative arrangements for micromanipulation with novel requirements. In discussing the various possible arrangements, two concepts will frequently appear. The first concept is "concentric bellows", an arrangement of two bellows in parallel with the ends thereof functionally joined together for movement as a unit. While the arrangement of one bellows about the other in a concentric or coaxial fashion offers certain advantages of compactness of design and a reduced likelihood of buckling of the inner bellows, in fact concentric bellows may be disposed in a parallel non-concentric disposition, but always with the ends functionally joined together for movement as a unit. The adapter plug of the inner bellows, and preferably the adapter plugs of both bellows, will extend axially from the bellows rather than transversely thereto. The concentric bellows is typically disposed in a mount or frame with a micrometer also secured to the frame and having its spindle (through a point-to-point or ball bearing contact if it is a rotating spindle) bearing against a movable common end plate of the two concentric bellows to force variations in fluid supply. The extension of the concentric bellows is determined exclusively by the setting of the micrometer as the backlash spring 52 operatively forces the movable common end against the micrometer spindle. Micrometer action collapsing the bellows will result in the displacement of fluid from each bellows, equal quantities of fluid being displaced from bellows of functionally equal cross-sectional area. Of course, the functional cross-sectional area of the outer bellows is deemed limited to the annulus between the bellows.

The second concept is the "reversing bellows assembly", generally designated RB, which utilizes a pair of concentric bellows (that is, bellows disposed in parallel with the ends joined for movement together as a unit), but there is no micrometer bearing on a common end plate of the two bellows to force variations in fluid supply. Instead, in a reverse bellows assembly, fluid is introduced into one of the bellows, thereby causing the expansion of both bellows, and the creation of a deficit at the second bellows which must be filled from the fluid supply associated therewith. Thus, as one fluid supply introduces into one bellows a quantity of fluid, it also forces another fluid supply to donate a like quantity of fluid to the linked bellows. In the reversing bellows assembly, as in all concentric bellows configurations, the displacement in one of the concentric pair must always affect the other. Thus fluid entering one of the bellows extends the other bellows, thereby reversing the hydraulic action by drawing fluid away from another source. Conversely, the lack of displacement in either bellows must always hold the other at constant displacement. Thus the reversing bellows assembly acts as a closed valve for one bellows when the other bellows is blocked. For example, if a reversing bellows assembly were disposed between a remote controller bellows 120 and a manipulator bellows 100, with the bellows 120 being associated with one of the reversing bellows and the bellows 100 being associated with the other, the injection of fluid into the line 140 by the remote controller bellows 120 would not result in a corresponding injection of a like quantity of fluid into the manipulator bellows 100, but rather would require a contribution of a like quantity of fluid to the reversing bellows from the manipulator bellows 100.

Figure 8:
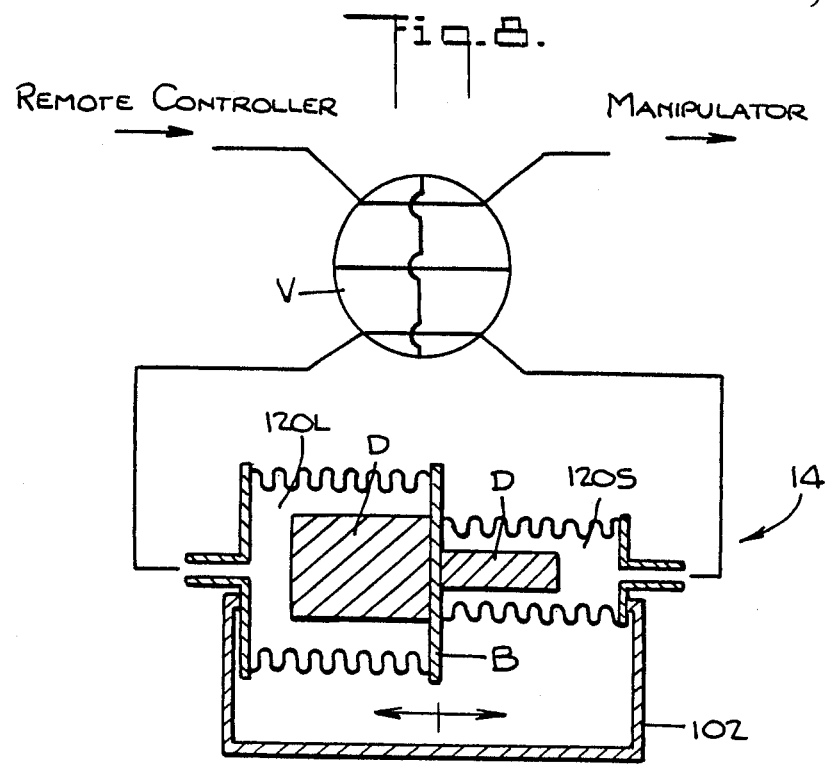
FIG. 8 is a schematic view of apparatus including a valve for variably scaling a hydraulic control.
Figure 9A:
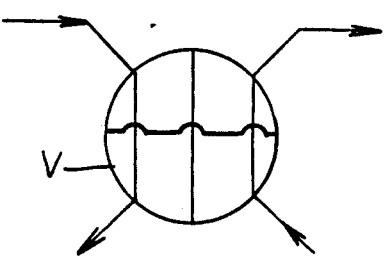
FIGS. 9A and B are schematic views showing alternate valve orientations for FIG. 8.
Figure 9B:
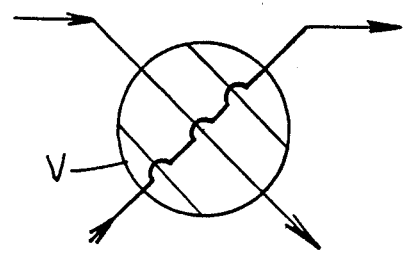

Referring now to FIGS. 8 and 9, therein illustrated in FIG. 8 is the variable hydraulic scaling device of the present invention including a valve in one orientation, with FIGS. 9A and 9B illustrating additional settings of the valve. The variable hydraulic scaling accessory is adapted to be inserted between the remote controller 14 and the micromanipulator 10, although it may be thought of conceptionally as part of either. The scaling device comprises a pair of bellows 120—a smaller diameter bellows 120S and a larger diameter bellows 120L—which are disposed in series and mounted in a frame or restraint 102 of fixed length so that a variation in the length of one bellows 120S, 120L necessarily varies the length of the other bellows 120L, 120S inversely due to the common end piece or abutting end pieces B of the two bellows 120S, 120L. The amount of scaling will depend upon the ratio of the cross-sections of the respective bellows 120S, 120L. A valve V is conveniently provided to permit scaling to be bypassed or inverted. Where such flexibility is not necessary, the valve V can be dispensed with. As the two bellows 120S, 120L forming the hydraulic scaling unit have their free ends fixed to the frame 102, there is no need for the ball bearing or point-to-point contacts used in connection with the micromanipulator bellows 100 or the remote controller bellows 120.

The valve V defines four independent passageways therethrough for fluid. For ease of understanding, the fluid flow is illustrated by arrows as effectively passing exclusively from the remote controller 14 to the manipulator 10, although in actual practice fluid flow would be in both directions. When the valve is in the orientation illustrated in FIG. 8, fluid passes directly from the remote controller 14 to the manipulator 10 without passing through the scaling apparatus and no hydraulic scaling occurs. (Rotation of the valve 180° would, of course, have the same effect.)

FIG. 9A shows the valve V oriented so that the fluid displaced from the remote controller 14 enters the large diameter bellows 120L and the fluid emerging from the small diameter bellows 120S is transmitted to the micromanipulator 10. Accordingly, the output:input ratio effected by the hydraulic scaler is the ratio of the cross-section areas of the small diameter bellows: large diameter bellows. In other words, the hydraulic scaling unit with the valve in this position effects a down scaling of the effective fluid flow from the remote controller to the manipulator. (Although actually the remote controller and manipulator are not in fluid communication, there is still an effective flow therebetween via the hydraulic scaling unit). Such down scaling is desirable where the remote controller is to effect fine control of the manipulator.

FIG. 9B shows the valve V oriented so that the fluid displaced from the remote controller 14 enters the small diameter bellows 120S and the fluid emerging from the large diameter bellows 120L is transmitted to the micromanipulator 10. Thus, the hydraulic scaling unit with the valve in this position effects up scaling of the effective fluid flow from the remote controller to the micromanipulator, with the scaling being proportional to the ratio of the cross-sectional areas of the large diameter bellows:the small diameter bellows. Such up scaling is desirable where the remote controller is to effect a coarse control of the micromanipulator.

Clearly a variable hydraulic scaling device may be provided for each axis of control, if desired.

Still referring to FIG. 8, a multipurpose rigid displacement plug D is shown in each of the bellows 120S, 120L. The rigid displacement plug D prevents overcompression of the bellows in which it is disposed and overextension of the other bellows linked thereto. Further, the rigid displacement plug D decreases the total volume of the bellows available for occupancy by the fluid and thus reduce the effect which thermal expansion and contraction of the fluid may have upon the linear extension of the bellows. Similar paired plugs (or an unpaired plug) may be used in the bellows 100, 120 of the micromanipulator and remote controller as shown in FIG. 13A (or either of them).

Figure 10:
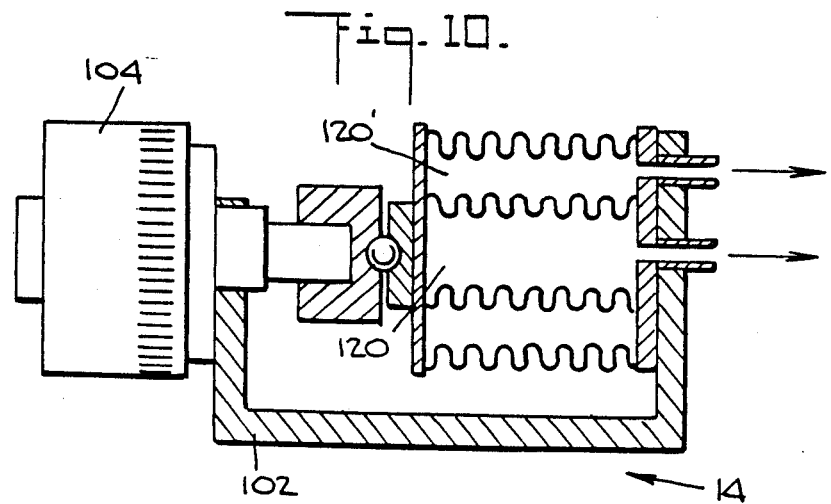
FIG. 10 is a schematic view of apparatus for coupled control of separate micromanipulators.

Referring now to FIG. 10, therein illustrated is a remote controller 14 including means for connecting the same to a plurality of micromanipulators 10 to effect identical movement in each. The connecting means comprise concentric bellows 120, 120 of identical effective cross-sectional area, both of the bellows 120, 120 being secured to a frame 102 and disposed in parallel with their respective ends joined together for movement as a unit. Each bellows is in fluid communication with the hydraulic control system of its respective micromanipulator. Rotation of the remote controller micrometer 104 in the appropriate direction causes both bellows 120, 120 to decrement in length, the amount of fluid being displaced from each bellows being directly related to the effective cross-sectional areas of the respective bellows.

Where the effective cross-sectional areas are the same, a plurality of microtools secured to different micromanipulators can be displaced equally along a given axis of control with the motion of only one micrometer in the remote controller. One or more reversing bellows assemblies may be employed if the movements of the micromanipulators are to be in opposite directions along a given axis—for example, to stretch both ends of a cell simultaneously while keeping the cell centered in a microscopic field. Where the effective cross-sectional areas of the respective bellows differ, the displacements of the micromanipulators served by the particular bellows will be related, but not identical. While the principle of coupled motion between separate micromanipulators has been illustrated with respect to only a single axis of control, clearly a similar coupling assembly can be provided for each desired axis of control.

Figure 11:
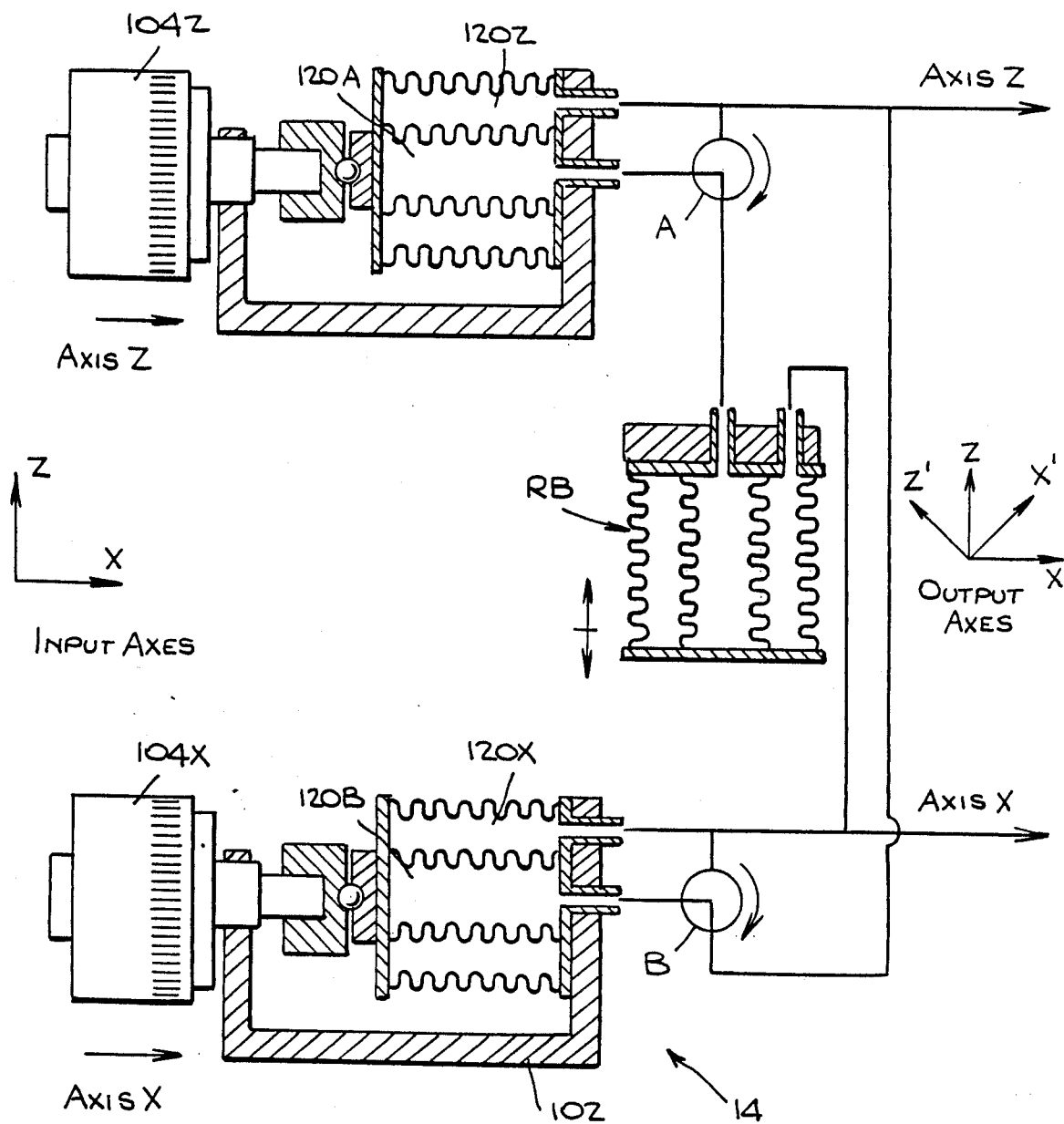
FIG. 11 is a schematic view of apparatus for tilting two orthogonal axes.

Referring now to FIG. 11, a remote controller 14 having three axes of control Z, X and Y effected by three bellows 120Z, 120X, and 120Y (bellows 120Y not being shown) has been modified so that two of the axes—axis Z and axis X—have bellows 120A and 120B, respectively, disposed in parallel therewith, preferably as concentric bellows. The ends of concentric bellows 120Z and 120A are joined together for movement as a unit, as are the ends of concentric bellows 120X and 120B. Each of the additional bellows—i.e., bellows 120A and 120B—discharge into valves A and B, respectively, each valve being movable between a tilt and no tilt position. A reversing bellows assembly RB is connected to bellows 120A through valve A and to bellows 120X directly. As fluid is introduced into one of the bellows of the reversing bellows assembly RB, it causes both bellows of the assembly RB to expand so that the second bellows draws fluid from its supply.

Bellows 120A feeds into the reversing bellows assembly RB through valve A when valve A is in the tilt position, but adds to the output of bellows 120Z when valve A is in the non-tilt position. Bellows 120B adds the output of bellows 120Z when valve B is in the tilt position, but adds to the output of bellows 120X when valve B is in the non-tilt position. Bellows 120X is directly connected to the micromanipulator, to bellows 120B through valve B when valve B is in the non-tilt position, and to the reversing bellows assembly RB. Thus when valve A is in the tilt position and the output of bellows 120A is expanding the reversing bellows assembly RB, a portion of the fluid from micrometer bellows associated with bellows 120X is drawn into the reversing bellows assembly RB. On the other hand, when valve A is in the non-tilt position, or when the volume of bellows 120A and hence its reversing bellows is constant, no fluid from the micrometer bellows associated with bellows 120X can be diverted into its reversing bellows.

Consideration of the tilting mechanism when both valves are closed shows that the original orthogonal axes of micromanipulation are preserved with both axis Z and axis X being fully independent of the other and non-interactive. Micrometer action for axis Z forces fluid from both its inner and outer bellows, the fluid then being channeled so as to control axis Z. This fluid cannot enter axis X because its pathway is blocked by valve B, and fluid cannot leave axis X because the reversing bellows assembly RB must stay at constant displacement, any change therein being blocked by closed valve A. Likewise, micrometer action for axis X can force fluid only into axis X as the pathway to axis Z is blocked by valve B and the displacement of the reversing bellows assembly RB is prevented by closed valve A.

On the other hand, when the valves A and B are turned to the tilt orientation, the two orthogonal axes of micromanipulation can be tilted. (To insure that the valves are linked together for both tilt and non-tilt orientation, they may be functionally linked together—for example, connected to each other end-to-end). Micrometer action for axis Z displaces one-half of the fluid in the concentric bellows 120Z, 120A into axis Z and one-half of the fluid into the reversing bellows assembly RB, the latter action drawing an equivalent amount of the fluid from axis X. The net result in displacement of the microtool will reflect a component in each axis. Because of the reversing bellows, the component of the fluid motion is now oppositely directed along axis X so that the resultant displacement will rotate the axis of motion counterclockwise (as denoted by axis Z'). No other displacements occur because the position of the micrometer controlling axis X has not been altered and hence fluid is not free to move from axis Z since movement into axis X through valve B is blocked by the fixed displacement enforced on the coupled bellows of axis X at the micrometer input thereto. Micrometer control of axis X is governed by similar principles. Micrometer action for axis X displaces one-half of the fluid in the concentric bellows 120X, 120B into axis X and one-half of the fluid into axis Z. However, since the fluid is displaced into axis Z directly (without passing through the reversing bellows assembly RB), the resultant displacement of the microtool reflects components of displacement which are in the original quadrant defined by axes Z and X. Thus, micrometer action for axis X results in a displacement which is shifted counterclockwise (as denoted by axis X.). In this way, the two orthogonal axes of micromanipulation can be tilted or not, with control being determined by a simple valve action.

The tilt facility allows one to approach a cell or other workpiece with a smooth action which is at an angle or tilt to the original horizontal or vertical axes. Tilt of the axes of fine control in the original Huxley-style manipulator was achieved by tipping the base of the whole manipulator. This meant sacrificing of the convenience of a horizontal plane of micromanipulation and therefore the ease of locating and positioning fine microtools in the shallow section of focus of a microscopic field. The tilt mechanism of the present invention enables coupled displacements and repositioning to be made in axes which do not parallel an original axis of displacement in the micromanipulator, the tilt being selected without any sacrifice of the original horizontal and vertical axes of fine control in the manipulator. Clearly axis Y can be substituted for axis X, etc.

Figure 12:
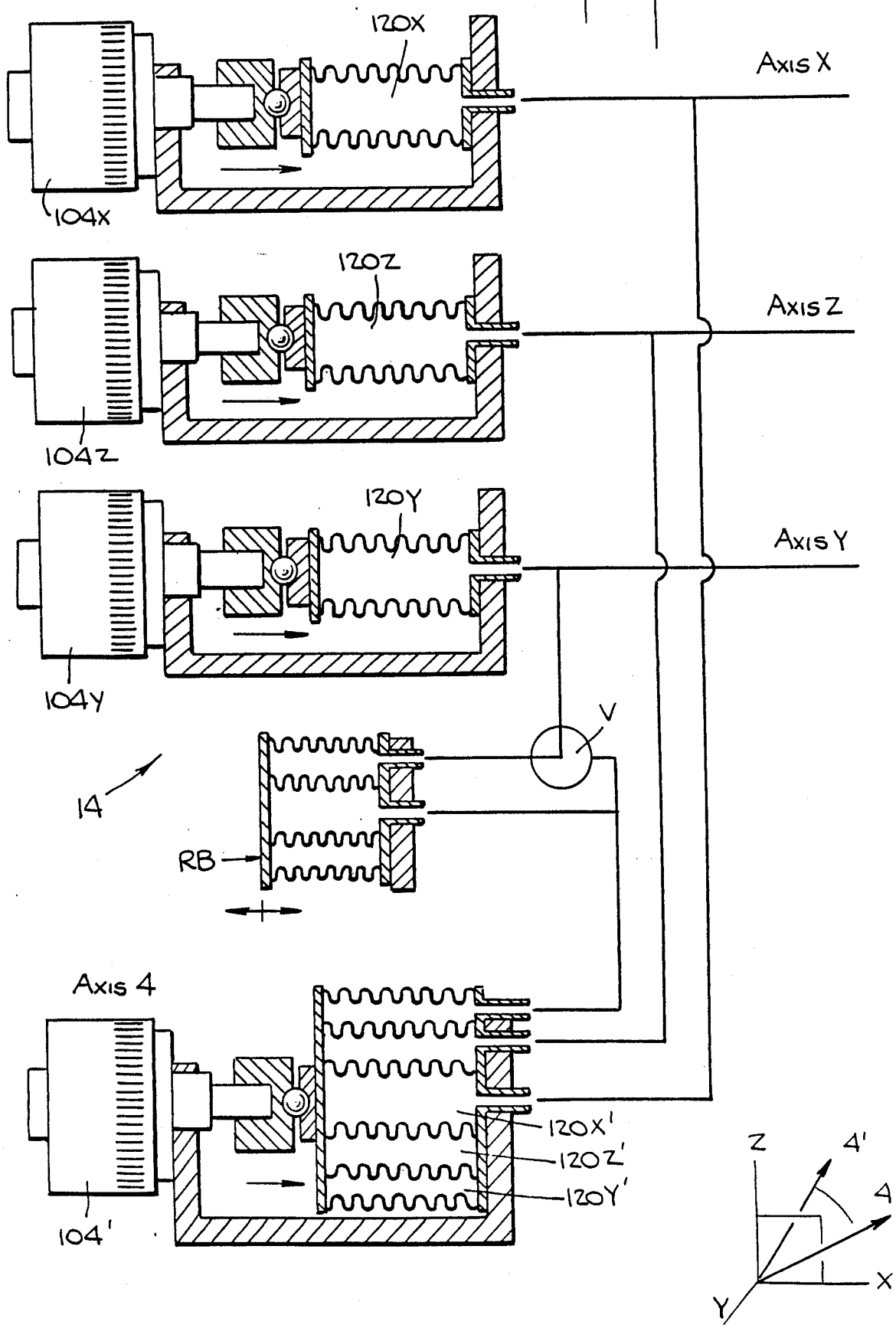
FIG. 12 is a schematic view of apparatus for providing a fourth axis of control.

Referring now to FIG. 12, therein illustrated is a remote controller 14 including means for providing a fourth axis of control without interfering with the three orthogonal axes of control X, Y, Z. In addition to the usual three micrometer drives 104X, 104Y, 104Z used to control motion of the three original axes of micromanipulation by bellows 120X, 120Y, 120Z, a fourth micrometer drive 104 is placed in parallel, this micrometer 104 controlling the displacement of three concentrically arranged bellows 120X', 120Y', 120Z'. The bellows 120X' is in fluid communication with X-axis bellows 120X, the 120Z' bellows is in fluid communication with the Z-axis bellows 120Z, and the bellows 120Y', through a reversing bellows assembly RB and valve V, is in fluid communication with the Y-axis bellows 120Y.

As earlier noted, the fluid volume in each bellows of the reversing bellows assembly RB is fixed as long as displacement at any point in its fluid path is blocked, either by a closed valve or a micrometer spindle. Thus, as long as the displacement of the fourth axis micrometer 104' is held constant, there is no fluid interaction with the other axes X, Y, Z. Conversely, assuming the valve V directly connects the bellows 120Y and 120Y' (bypassing the reversing bellows assembly RB). micrometer action of the fourth axis micrometer 104' displaces fluid from its bellows 120X', 120Y', 120Z' to the other three axes of control X, Y, Z, and the resultant displacement (denoted by axis 4) reflects the respective component added to each axis. A reversing option is obtainable by rotating the valve so that bellows 120Y and bellows 120Y' are in effective fluid communication only through the reversing bellows assembly RB. The reversing option permits the fourth axis of control to be selectively oriented on the opposite side of the plane determined by axes X and Z (i.e., axis 4') since with this action the fluid is drawn out of Y-axis manipulator bellows 100Y and so this component of coupled displacement is reversed. More particularly, the reversing option permits the fourth axis of control to be selectively oriented on either side of the vertical XZ plane.

The fourth axis of control proves useful in many applications. For example, when impaling single cells with a microelectrode, it is desirable to be able to drive the microelectrode into the cell with a smooth action which is coincident with the axis of the microelectrode. This axis is rarely coincident with the original orthogonal axes of micromanipulation and therefore constitutes a fourth axis of control. Prior art attempts to provide such a fourth axis of control have generally lead to unwanted interactions between the actuator elements being coupled, and hence errors in displacement. Precisely to avoid such unwanted interactions, prior art attempts to provide a fourth axis of control have often been based upon providing an expensive, fully independent fourth assembly. Applicant's fourth axis mechanism provides the same independence without unwanted interaction at a fraction of the cost as it uses the bellows already existing in the micromanipulator of the present invention.

The accessories described above enable the investigator to tailor the micromanipulator of the present invention to his particular requirements. The scaling option utilizes the versatility of hydraulic bellows for scaling motions which parallel the original three axes of displacement of the manipulator. The scaling option enables the selection of fine or coarse control of short range displacements. Similarly, the versatility of hydraulic bellows enables the single remote micrometer drive to be used to couple and scale motion in several dimensions. Thus several microtools held by different manipulators can be controlled with only one remote motion. The versatility of the hydraulic bellows further permits the selection of tilt in two orthogonal axes of remote manipulation without impairment of control along the three original axes of manipulation or enables the addition of a fourth axis of control. Both of these modification in a remote control unit permit another degree of freedom in fine control without any requirement of introducing additional bellows into the base of the Huxley-style manipulator of the present invention.

Referring now to FIG. 13, therein illustrated is a mechanism for compensating for the thermal expansion and contraction of the fluid in the hydraulic control system. In FIG. 13A, the hydraulic control system is indicated schematically by the two bellows 100, 120, the tubing 140 connecting the two bellows and the additional tubing 200 connecting the tubing 140 to the thermal compensating apparatus. Volume reduction plugs 202 are disposed within the bellows 100, 120 and serve to reduce the fluid volume therein, thereby minimizing the amount of thermal expansion or contraction for which compensation is required. The thermal reduction plugs 202 need not be of equal volume, or even equal length. While the volume reduction plugs 202 reduce the amount of thermal expansion and contraction which must be compensated for by the thermal compensating apparatus, clearly they cannot by themselves negate the effects of thermal expansion and contraction completely.

Each of the embodiments of the thermal compensating apparatus utilizes a pair of auxiliary bellows 204, 206 of equal effective cross-sectional area disposed in parallel, with the respective ends of each being joined together for movement as a unit—in other words, concentric bellows without any micrometer to vary the lengths thereof. One of the auxiliary bellows is a line bellows 204 in fluid communication with the line 200 and hence the hydraulic control including the bellows 100, 120 and tubing 140. The other of the auxiliary bellows is a compensating bellows 206 which is isolated from the line 200 and the hydraulic control. The compensating bellows 206 in each embodiment contains an excess of the substantially incompressible fluid relative to the line bellows 204. Thus a change in the length of the compensatory bellows 206 due to thermal expansion or contraction of the fluid therein results in at least a partially compensatory change in the length of the line bellows 204 to accommodate the thermal expansion or contraction of fluid in the hydraulic control. The excess of fluid in the compensating bellows 206 relative to the line bellows 204 is preferably substantially equal to the volume of fluid in the entire hydraulic control, including line 200, so that full thermal compensation is provided.

In the embodiment of FIG. 13B, the compensating bellows 206 includes a non-extensible reservoir 210 which increases the effective internal volume or fluid-holding capacity of the compensating bellows 206. The fluid in the reservoir 210 acts together with the fluid in the main body of the compensating bellows 206 to expand the line bellows 204, and hence the linked bellows 206, as the fluid undergoes thermal expansion. Where the fluid in the reservoir 210 is equal in volume to the fluid in the hydraulic control, then the expansion of the compensating bellows 206 will effect an expansion of the line bellows 204 by an amount just sufficient to accommodate the increment in line fluid volume resulting from thermal expansion of the fluid in the hydraulic control.

FIG. 13C illustrates a first alternative of the thermal compensating mechanism in which the line bellows 204 includes a negative reservoir 212 which excludes fluid therefrom. The negative reservoir 212 may conveniently be a solid or fluid-tight block of incompressible material disposed at one end of the line bellows 204 and reducing its effective internal volume (i.e., its fluid holding capacity) relative to the compensating bellows 206. FIG. 13D illustrates a second alternative of the thermal compensating mechanism in which the line bellows 204 includes therewithin a volume reduction plug 214, shown as being annular in configuration. Both the negative reservoir 212 of the first alternative and the volume reduction plug 214 of the second alternative reduce the effective internal volume or fluid-holding capacity of the line bellows 204 relative to the compensating bellows 206 so that the compensating bellows 206 contains an excess of fluid, the excess preferably being equal in volume to the fluid volume of the hydraulic control. Accordingly, the thermally induced increase in the volume of the compensating bellows 206 induces through the mechanical linkage of the two bellows 204, 206 an increase in the volume of the line bellows 204 which is greater than the thermally induced increase of the fluid originally in the line bellows 204, and so the excess fluid resulting from thermal expansion in the hydraulic control is drawn into the line bellows 204.

The thermal compensating system may be part of the remote controller 14 or a free standing unit for use in connection with any of the individual hydraulic control lines of one of the accessories illustrated in FIGS. 4 and 10-12. Where there are two separate hydraulic control lines not in fluid communication with each other—for example, as in the case of the scaling accessory, the coupled control accessory, the tilt accessory and the fourth axis control accessory—a separate thermal compensating apparatus may be used in connection with each separate hydraulic control line. Its use in connection with each line of the scaling apparatus illustrated in FIG. 8 is an important safety feature to minimize the danger of serially disposed bellows 120S, 120L bursting due to their confinement in a fixed length frame. Full or partial compensation may be provided as desired, alone or in combination with volume reduction plugs D or 202. Because the thermal compensating apparatus does not effect any change in the pressure of the fluid in the hydraulic control system, it may advantageously be used in connection with micromanipulators which rely on hydraulic pressure (rather than hydraulic volumes) such as the Narishige manipulators. The thermal compensating apparatus may be employed with any micropositioning device using either hydraulic or pneumatic control system so long as the compensating bellows 206 is filled with a substantially incompressible liquid.

As one reason for the length of the lever arms in the Huxley-style manipulator is to minimize the effect of temperature fluctuations, the thermal compensation mechanism of the present invention enables the use of shorter lever arms and hence a micromanipulator of reduced vertical dimensions.

Figure 14:
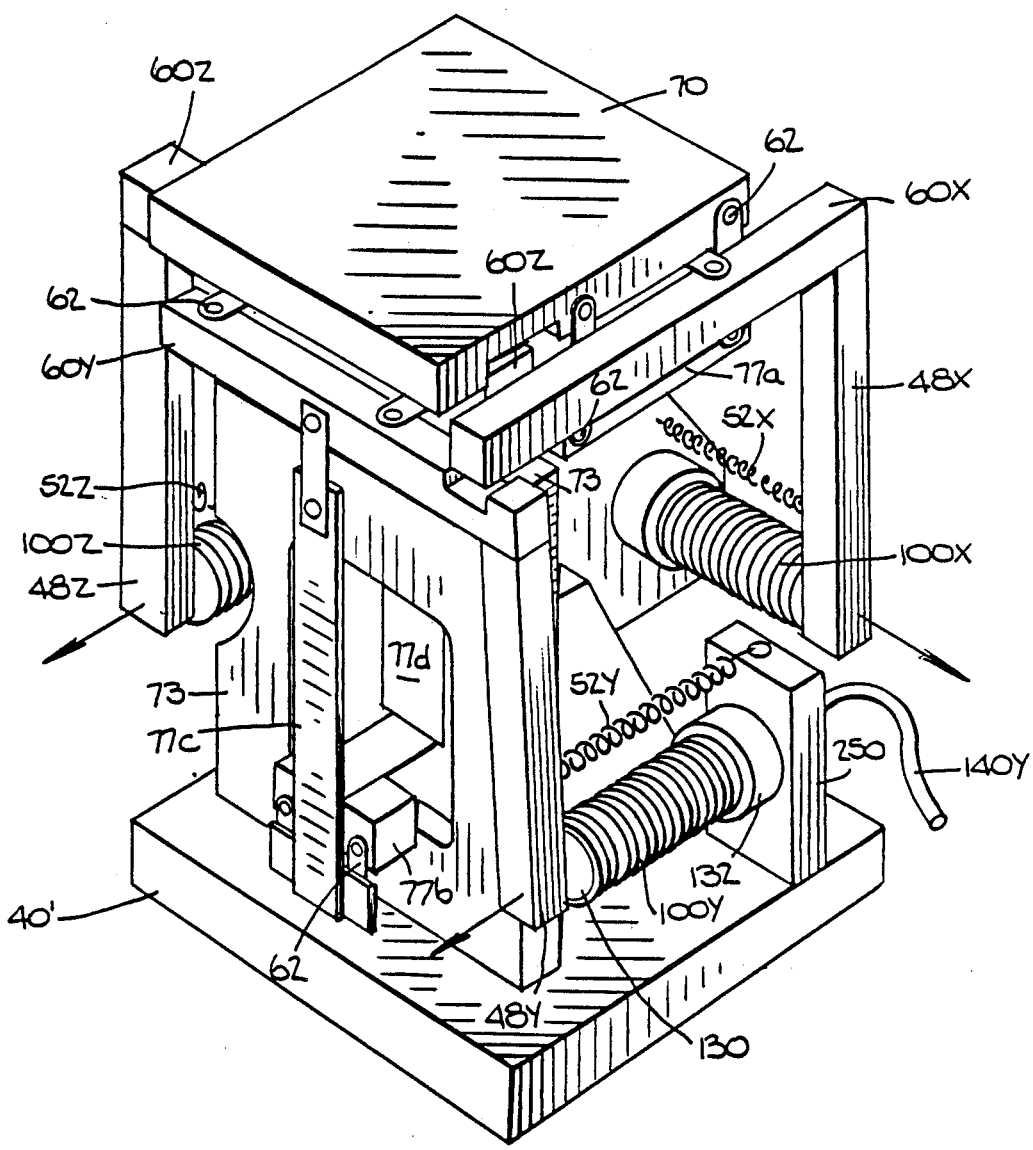
FIG. 14 is a perspective view of a compact micromanipulator without micrometers.

Referring now to FIG. 14, therein illustrated is a compact Huxley-style manipulator according to the present invention. The micrometers 42 and their support frame 40 have been removed and replaced by horizontally disposed hydraulic bellows 100 and a base 40'. Bellows 100Y is anchored by its respective larger end piece 132 which is journaled into bracket 250 affixed to the base plate 40' of the micromanipulator. The bellows element (and 100Z) which controls displacement in the X-axis (and Z-axis) is anchored in similar fashion to a downward vertical extension 77d of the horizontal stabilizer plate 77a. The larger end piece 132 of each bellows is in fluid connection with the hydraulic line 140 which supplies fluid displaced from an associated bellows 120 in remote controller 14. The smaller end piece 130 of each bellows 100 has a small dimple which seats a ball bearing 79, which in turn contacts the free end of the respective lever arm 48 to permit rotation of the end of the lever arm 48 as the bellows 100 is extended. Extension backlash springs 52 hold the lever arms 48 in firm contact with the respective bellows 100. The lever arms 48 functionally engage the top plate 70 as described earlier.

It will be appeciated that the position of the X-axis lever bar 48X has been moved to the rear of the manipulator, a change which simplifies the mechanical linkage between the Y-axis control bar 60Y and its lever arm 48Y as compared to that in the original Huxley design. It is also notable that in this arrangement the bellows 100X which controls the X-axis lever arm 48X is connected directly to the horizontal stabilizer plate 77a as is the Z-axis bellows 100Z. Thus all of the bellows 100 remain perfectly aligned with their respective lever arms 48, irrespective of manipulator-caused displacement in other directions. In all prior versions of the Huxley style manipulator, micromanipulation in the vertical axis caused a comparable displacement which results in a vertical misalignment of the X-axis connecting member 50X. Unlike the prior manipulator driven by large, immovable micrometers, the bellows is a small unit which can be integrated totally with each respective fulcrum assembly. Thus, in this scheme, displacement in any axis is completely independent of displacement in the other two axes, thereby providing enhanced accuracy.

Displacements in the original Huxley-style manipulator are controlled by the presence of three large micrometers. As can be seen in FIGS. 1-3, their presence greatly expands its footprint (i.e., the area occupied by the device) and this means that it is inconvenient to place more than two devices at a given microscope. The placement of the micrometers (or for that matter any source of motor input) also dictates that these manipulators must be constructed as right- or left-hand versions. These changes allow several practical improvements over the original Huxley design. First, the footprint of the manipulator can be reduced by at least 75% by the removal of the micrometer drives. Thus, four units could easily be placed around a microscope. The smaller footprint means also that the device can easily be rotated to gain access to the microtool. Second, the height of the manipulator is reduced by at least 40% by shortening of the lever arms. Shortening of the lever arm increases the range of motion, and negative mechanical advantage can be achieved by a hydraulic scaling as described hereinabove. Third, remote control is achieved, and with it the previously noted advantages and flexibilities of remote control. To summarize, the compact micromanipulator is characterized by an absence of micrometers, a smaller footprint, and a lower profile; yet it affords greater accuracy and flexibility than the original Huxley-style micromanipulator.

Wherever concentric bellows are postulated, unless otherwise indicated, the two bellows should be of equal functional cross-sectional area. While typically the same principles apply where the bellows are not of equal functional cross-sectional area, more complex systems result and prediction of the results may be more difficult, but just as accurate. For example, in the coupled control accessory for the control of separate manipulators, if bellows 120 and 120 are not of equal functional cross-sectional length the movement in one micromanipulator along one axis will be related to, but different from, the movement in the other micromanipulator along the same axis, all other factors being equal. On the other hand, the accessories and mechanisms described herein may be employed in conjunction with the other features of the present invention where it is desired to obtain special or joint effects. For example, in the context of the same coupling control mechanism for separate micromanipulators, the output from one of the mechanism bellows 120, 120 may be input to a reversing bellows assembly RB with the other input being the bellows of one of the coupled micromanipulators. This would result in the coupled micromanipulators exhibiting movement of the microtool along the same axis of control, but in opposite directions.

While the present specification assumes that fluids of like properties will be used throughout a hydraulic system, obviously different fluids may be employed, e.g., on opposite ends of a scaling mechanism.

To summarize, the present invention provides a Huxley-type micromanipulator having remote control which is either added to the micrometer control without adding to the footprint of the micromanipulator or used as a substitute therefor so as to enable a smaller footprint for the micromanipulator. The micromanipulator remote control does not require separate right- and left-handed versions, permits tilting of particular axes without tilting of the micromanipulator base, and can provide more than three axes of control. The micromanipulator utilizes hydraulic controls which are substantially insensitive within limits to the pressure placed on the micromanipulator output by weights and acceleration, and the remote control permits coupling, scaling, tilt and additional degrees of freedom to be provided without interaction between hydraulic control systems. Automatic thermal compensation apparatus is provided for compensation for the thermal expansion and contraction of the fluid in the hydraulic control of any hydraulic system. A compact micromanipulator is characterized by an absence of micrometers, a smaller footprint, and a lower profile; yet it affords greater accuracy and flexibility than the original Huxley-style micromanipulator.

Now that the preferred embodiments of the present invention have been shown and described, various modifications and improvements thereon will become readily apparent to those skilled in the art. Accordingly, the appended claims are to be construed broadly and in a manner consistent with the spirit and scope of the invention herein.

I claim:

1. A micromanipulator for making precise, reproducible microadjustments of the position of a platform adapted to support a microtool for relative movement, comprising:
   (A) a frame;
   (B) a lever arm associated with said frame and adapted to functionally engage the platform;
   (C) a hydraulically-operated fluid-tight bellows member in operative engagement at one end with said frame and at the other end with said lever arm, said bellows member being reversibly adjustable in length with a functionally substantially constant average cross-sectional area; and
   (D) means for reversibly supplying said bellows member with a substantially incompressible liquid to adjust the length of said bellows member, thereby effecting microadjustments to the position of the platform relative to said frame.

2. The micromanipulator of claim 1 wherein said supplying means comprises a second frame, a second bellows member, a micrometer for reversibly adjusting the length of said second bellows member, and tubing connecting said second bellows member and said bellows member.

3. The micromanipulator of claim 1 for adjusting the position of a workpiece via a remote controller, including a substantial length of flexible tubing of substantially constant average internal diameter connecting said remote controller and said bellows member in fluid communication, said remote controller being adapted to be remotely disposed from said bellows member.

4. The micromanipulator of claim 1 wherein said bellows member is metallic.

5. The micromanipulator of claim 1 wherein said bellows member is formed of electrodeposited nickel.

6. The micromanipulator of claim 1 wherein said bellows member has a pleated or convoluted sidewall.

7. A system comprising at least a pair of micromanipulators according to claim 1, each of said micromanipulators sharing a common supplying means for proportionally adjusting the length of said bellows member thereof.

8. A micromanipulator for making precise, reproducible microadjustments of the position of a platform adapted to support a microtool for relative movement, comprising:
   (A) a frame;
   (B) a lever arm associated with said frame and adapted to functionally engage the platform;
   (C) a hydraulically-operated fluid-tight bellows member in operative engagement with said lever arm, said bellows member being reversibly adjustable in length with a functionally substantially constant average cross-sectional area;
   (D) means for reversibly supplying said bellows member with a substantially incompressible liquid to adjust the length of said bellows member, thereby effecting microadjustments to the position of the platform; and
   (E) means coupled to said bellows member for adjustably positioning said bellows member without adjusting the length thereof, thereby effecting macroadjustments to the position of the platform relative to said frame.

9. The micromanipulator of claim 8 having a plurality of said lever arms, a like plurality of said positioning means, a like plurality of said bellows member, and a like plurality of said supplying means, each of said bellows members being in fluid communication with a respective supplying means and being disposed with a first portion in engagement with a respective lever arm and a second portion coupled to a respective positioning means.

10. The micromanipulator of claim 9 for adjusting the position of the platform in three orthogonal axes comprising three of said lever arms adapted to functionally bear orthogonally on the platform, three of said positioning means, three of said bellows members, and three of said supplying means, each of said bellows members being disposed intermediate a respective one of said positioning means and a respective one of said lever arms.

11. The micromanipulator of claim 8 wherein said positioning means comprises a micrometer fixed to said frame and bearing on said bellows member.

12. The micromanipulator of claim 8 wherein the length of said bellows member remains substantially constant in response to adjustable positioning thereof by said positioning means.

13. The micromanipulator of claim 8 wherein said supplying means comprises a second frame, a second bellows member, a micrometer for reversibly adjusting the length of said second bellows member, and tubing connecting said second bellows member and said bellows member.

14. The micromanipulator of claim 8 for adjusting the position of a workpiece via a remote controller, including a substantial length of flexible tubing of substantially constant average internal diameter connecting said remote controller and said bellows member in fluid communication, said remote controller being adapted to be remotely disposed from said bellows member.

15. The micromanipulator of claim 8 wherein said bellows member is metallic.

16. The micromanipulator of claim 8 wherein said bellows members is formed of electrodeposited nickel.

17. The micromanipulator of claim 8 wherein said bellows member has a pleated or convoluted sidewall.

18. A system comprising at least a pair of micromanipulators according to claim 8, each of said micromanipulators sharing a common supplying means for 19. A micromanipulator for adjusting the position of a workpiece by remote control comprising:
   (A) a frame and a plurality of positioning means mounted on said frame, each positioning means having a spindle and means for adjustably positioning said spindle;
   (B) a plurality of lever arms associated with said frame, each lever arm adapted to functionally engage the workpiece and a respective different one of said positioning means;
   (C) a plurality of hydraulically-operated fluid-tight metallic bellows members, each of said bellows members being disposed intermediate a respective one of said spindles and a respective one of said lever arms, each of said bellows members being adjustable in length with a substantially constant average cross-sectional area, the length of said bellows members remaining substantially constant in response to manipulation of said positioning means; and (D) a plurality of remote control means for remotely supplying substantially incompressible fluid to a respective one of said bellows members to adjust the length thereof independently of the other of said bellows members to effect micromanipulation of the workpiece.

20. The micromanipulator of claim 19 wherein each of said positioning means and each of said remote control means comprises a micrometer.

21. A micromanipulator system for making precise, reproducible microadjustments in three orthogonal axes of the position of a micromanipulator platform adapted to support a microtool for relative movement, comprising:

(A) a compact micromanipulator, characterized by an absence of micrometers, including a frame and, for each axis, a lever arm adapted to functionally engage the platform and a hydraulically-operated fluid-tight bellows member reversibly adjustable in length with a substantially constant average cross-sectional area, said respective bellows member having one end fixed against axial displacement in one direction and the other end operatively bearing in the opposite direction against said lever arm, said respective bellows member being fixed in a horizontal plane irrespective of displacements by the micromanipulator in any axis; and (B) a remote controller including means for reversibly supplying said respective bellows member of said micromanipulator with a substantially incompressible liquid to adjust the length of said respective bellows member, thereby effecting microadjustments to the position of the platform.

22. A micromanipulator having a hydraulic control for making precise, reproducible microadjustments of the position of a platform adapted to support a microtool for relative movement, comprising:

(A) a frame;
(B) a lever arm associated with said frame and adapted to functionally engage the platform;
(C) a hydraulically-operated fluid-tight bellows member in operative engagement at one end with said frame and at the other end with said lever arm, said bellows member being reversibly adjustable in length with a functionally substantially constant average cross-sectional area;
(D) means for reversibly supplying said bellows member with a substantially incompressible liquid to adjust the length of said bellows member, thereby effecting microadjustments to the position of the platform relative to said frame; and
(E) means for compensating for thermal compression and expansion of the liquid in the hydraulic control, said compensating means comprising a pair of additional bellows members disposed in parallel, with the respective ends of each being joined together for movement as a unit, one of said additional bellows members being a line bellows member in fluid communication with the hydraulic control, and the other of said additional bellows members being a compensating bellows member isolated from the hydraulic control and physically containing therewithin an excess of liquid relative to said line bellows member, each said additional bellows member being reversably adjustable in length with a functionally substantially constant average cross-sectional area, whereby a change in the length of said compensatory bellows member due to thermal expansion or contraction of the liquid therein results in an at leat partially compensatory change in the length of said line bellows member to accommodate the thermal expansion or contraction of liquid in the hydraulic control.

23. The micromanipulator of claim 22 wherein said line bellows member operatively includes a negative reservoir to reduce the effective volume thereof relative to that of said compensating bellows member.

24. The micromanipulator of claim 23 wherein said additional bellows members are of equal effective cross-sectional area, and said negative reservoir has an internal volume equal to the volume of liquid in the hydraulic control.

25. The micromanipulator of claim 22 wherein the pressure in the volume of liquid in the hydraulic control is constant.

26. The micromanipulator of claim 22 wherein said additional bellows members are of equal effective cross-sectional area, and said compensating bellows member has an excess of liquid therein relative to said line bellows member substantially equal to the volume of liquid in the hydraulic control.

27. A micromanipulator have a hydraulic control for making precise, reproducible microadjustments of the position of a platform adapted to support a microtool for relative movement, comprising:

(A) a micromanipulator frame;
(B) three lever arms associated with said micromanipulator frame and adapted to functionally engage the platform orthogonally;
(C) three hydraulically-operated fluid-tight micromanipulator bellows members in operative engagement at one end with said micromanipulator frame and at the other end with a respective one of said lever arms, each said micromanipulator bellows member being reversibly adjustable in length with a functionally substantially constant average cross-sectional area;
(D) three positioning means secured to said micromanipulator frame and coupled to a respective one of said micromanipulator bellows members for adjustably positioning said respective one micromanipulator bellows member independently of the other micromanipulator bellows members and without adjusting the length of any bellows member, thereby to effect macroadjustments to the position of the platform relative to said micromanipulator frame; and
(E) means for reversibly and independently supplying each said micromanipulator bellows member with a substantially incompressible liquid to adjust the length of said micromanipulator bellows member independently of the other micromanipulator bellows members, thereby effecting microadjustments to the position of the platform relative to said micromanipulator frame, said supplying means including;
 (i) a controller frame;
 (ii) three fluid-tight controller bellows members of functionally substantially constant effective cross-sectional area and reversibly adjustable length, each said controller bellows member being mounted on said controller frame and adapted to be in fluid communication with a respective one of said micromanipulator bellows members, both said micromanipulator and controller bellows members being filled with hydraulic fluid; and (iii) three associated positioning means secured to said controller frame and bearing on a respective one of said controller bellows members to reversibly adjust the length thereof and thereby reversibly supply the hydraulic fluid to said respective one micromanipulator bellows member.

28. The micromanipulator of claim 10 wherein said bellows members are disposed at 90° to each other.

29. The micromanipulator of claim 19 wherein said bellows members are disposed at 90° to each other.

30. The micromanipulator of claim 27 wherein said bellows members are disposed at 90° to each other.

31. The micromanipulator of claim 19 wherein said plurality of said lever arms, said plurality of said positioning means, said plurality of said bellows members, and said plurality of said remote control means are like pluralities, each of said bellows members being in fluid communication with a respective remote control means and being disposed with a first portion in engagement with a respective lever arm and a second portion coupled to a respective positioning means.

32. The micromanipulator of claim 31 for adjusting the position of the platform in three orthogonal axes comprising three of said lever arms adapted to functionally bear orthogonally on the platform, three of said positioning means, three of said bellows members, and three of said remote control means, each of said bellows members being disposed intermediate a respective one of said positioning means and a respective one of said lever arms.

* * * * *